United States Patent
Newell et al.

[11] Patent Number: 6,101,911
[45] Date of Patent: *Aug. 15, 2000

[54] APPARATUS AND METHOD FOR AUTOMATICALLY COMPENSATING FOR LATERAL RUNOUT

[75] Inventors: Harold Newell, S. Newbury; John Wiggins, Sunapee, both of N.H.

[73] Assignee: Joseph B. Willey, Lebanon, N.H.

[ * ] Notice: This patent is subject to a terminal disclaimer.

[21] Appl. No.: 09/182,429

[22] Filed: Oct. 30, 1998

Related U.S. Application Data

[63] Continuation-in-part of application No. 08/706,512, Sep. 4, 1996, Pat. No. 5,974,878, and a continuation-in-part of application No. 08/706,514, Sep. 4, 1996.

[51] Int. Cl.[7] ..................................................... B23B 5/04
[52] U.S. Cl. ................................. 82/112; 82/151; 82/152; 82/163
[58] Field of Search ............................. 82/112, 151, 150, 82/101, 903, 170, 152, 163; 74/575, 577 R, 577 M

[56] References Cited

U.S. PATENT DOCUMENTS

| | | |
|---|---|---|
| 1,236,748 | 8/1917 | Osberg et al. . |
| 1,554,302 | 9/1925 | Slyder et al. . |
| 2,546,225 | 3/1951 | Julian et al. . |
| 3,303,709 | 2/1967 | Slisz et al. . |
| 3,373,622 | 3/1968 | Stautmeister . |
| 3,540,164 | 11/1970 | Lanham . |
| 3,663,795 | 5/1972 | Myer . |
| 3,895,539 | 7/1975 | Weman et al. . |
| 3,951,563 | 4/1976 | Ravenhall . |
| 4,226,146 | 10/1980 | Ekman . |
| 4,336,730 | 6/1982 | Kopecko et al. . |
| 4,388,846 | 6/1983 | Kopecko et al. . |
| 4,452,111 | 6/1984 | Anderson . |
| 4,478,116 | 10/1984 | Fuller . |
| 4,493,231 | 1/1985 | Wossner . |
| 4,523,499 | 6/1985 | Aldridge, Jr. . |
| 4,640,158 | 2/1987 | Link et al. . |
| 4,678,408 | 7/1987 | Nason et al. . |
| 4,703,977 | 11/1987 | Haanschoten . |
| 4,854,199 | 8/1989 | Norman . |
| 5,054,918 | 10/1991 | Downing et al. . |
| 5,099,728 | 3/1992 | Thiem . |
| 5,201,586 | 4/1993 | Zimmermann et al. . |
| 5,279,192 | 1/1994 | Hartman ..................................... 82/112 |
| 5,347,895 | 9/1994 | Bellinghausen et al. .................. 82/112 |
| 5,499,563 | 3/1996 | Hansen . |
| 5,549,023 | 8/1996 | Strout et al. ............................... 82/112 |
| 5,602,733 | 2/1997 | Rogers et al. . |
| 5,615,589 | 4/1997 | Roach ........................................ 82/112 |
| 5,653,153 | 8/1997 | Greenwald ................................ 82/1.11 |

FOREIGN PATENT DOCUMENTS

| | | | |
|---|---|---|---|
| 1650731 | 2/1974 | Germany ................................. | 74/575 |

*Primary Examiner*—Henry W. H. Tsai
*Attorney, Agent, or Firm*—Fish & Richardson, PC

[57] ABSTRACT

An on-car disc brake lathe system for resurfacing a brake disc of a vehicle brake assembly includes a lathe body with a driving motor, a cutting head operably attached to the lathe body, and a drive shaft. The system also includes an alignment system having an electronic controller, input and output adaptors configured to rotate with the drive shaft, one or more adjustment discs, and an adjustment mechanism. The adjustment disc is positioned between the input adaptor and the output adaptor, and an axial alignment of the input adaptor relative to the output adaptor may be varied based on a rotational orientation of the adjustment disc. The adjustment mechanism is configured to change the rotational orientation of the adjustment disc in response to commands from the electronic controller.

58 Claims, 29 Drawing Sheets

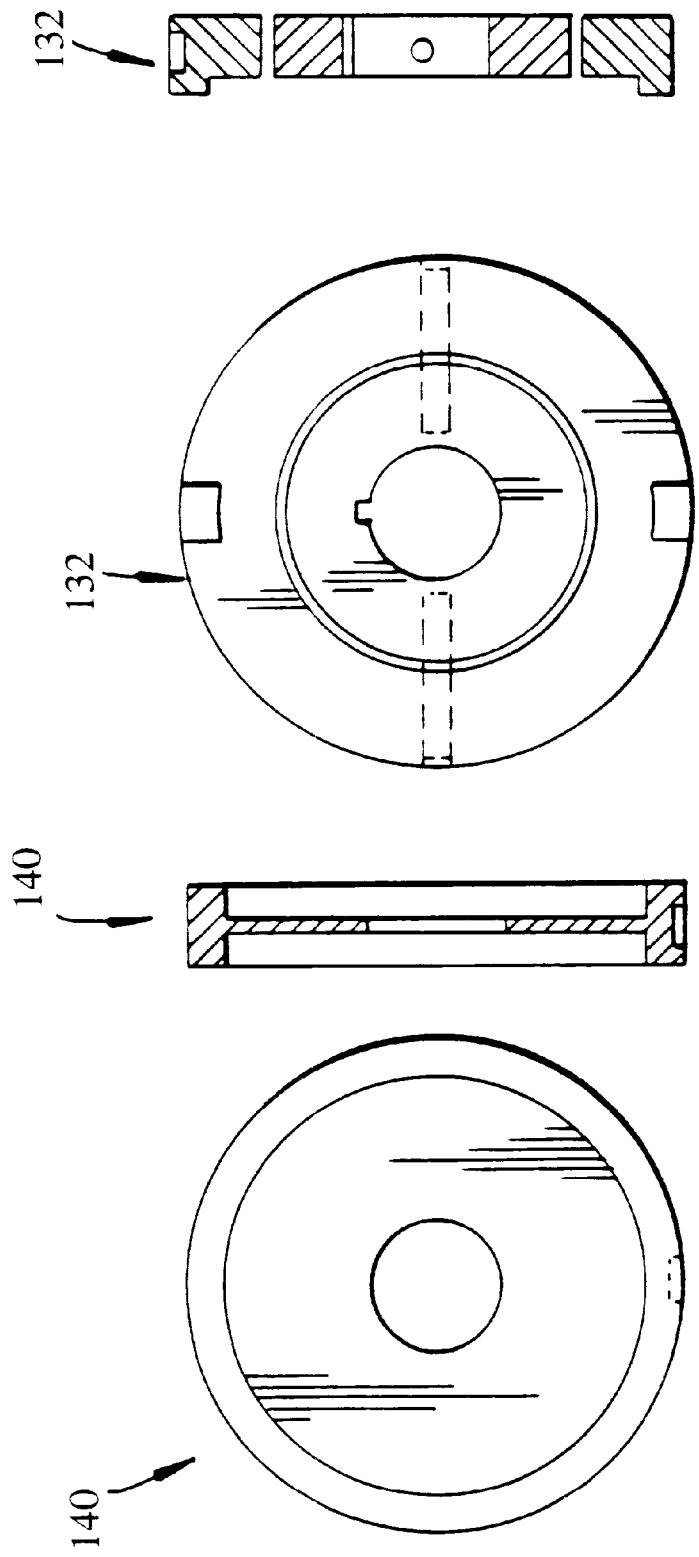

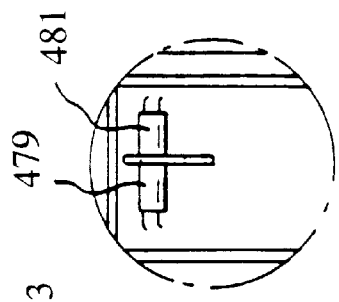
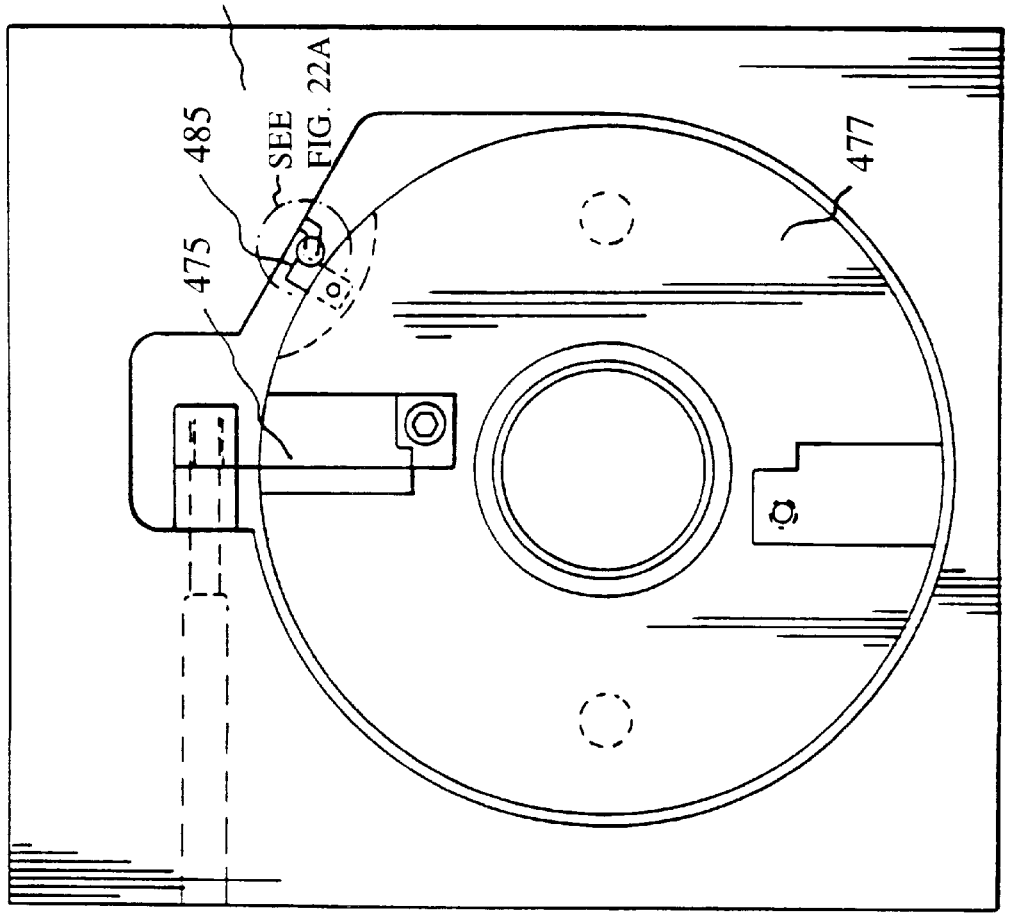
FIG. 22A
FIG. 22

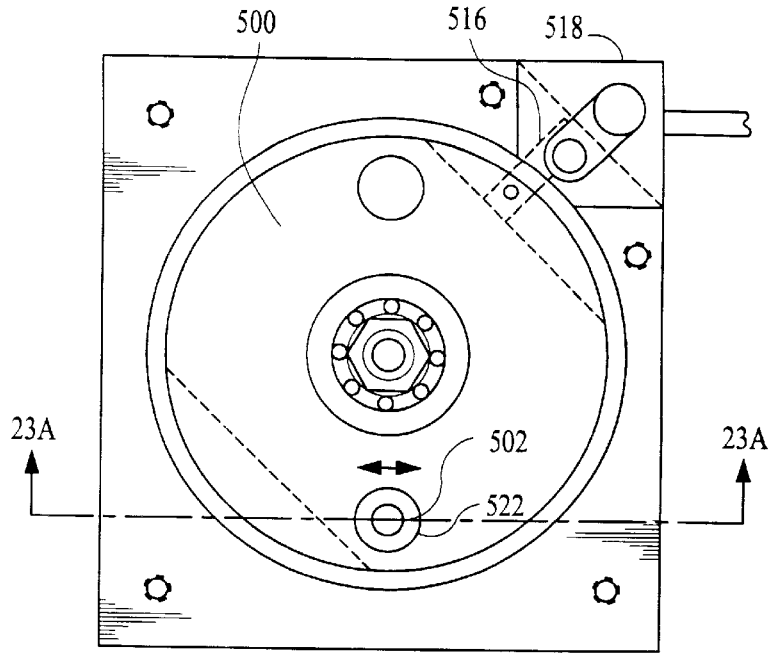
FIG. 23
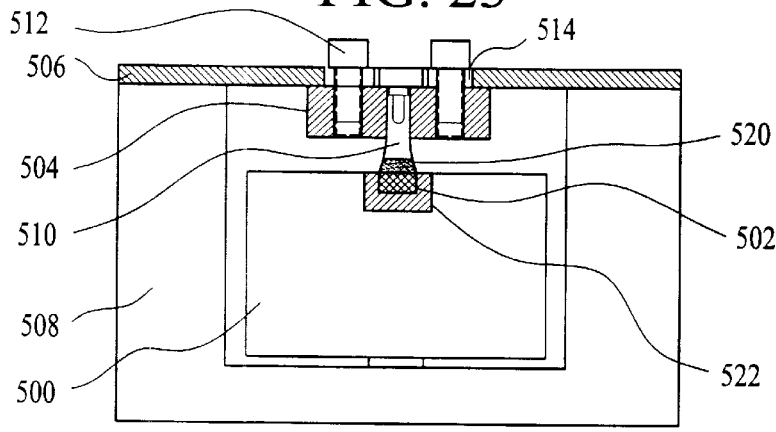
FIG. 23A
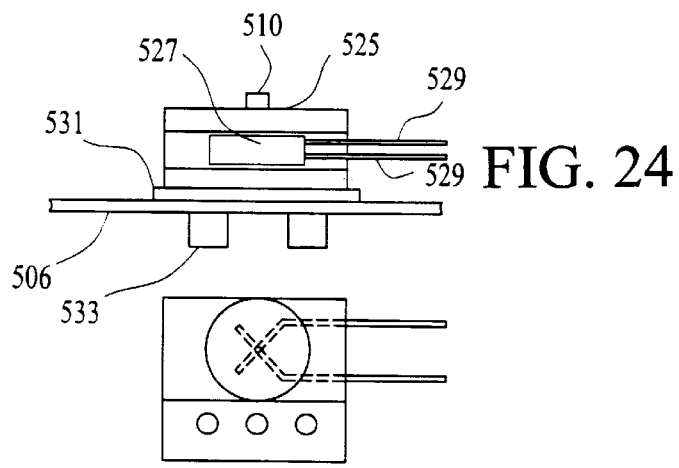
FIG. 24
FIG. 24A

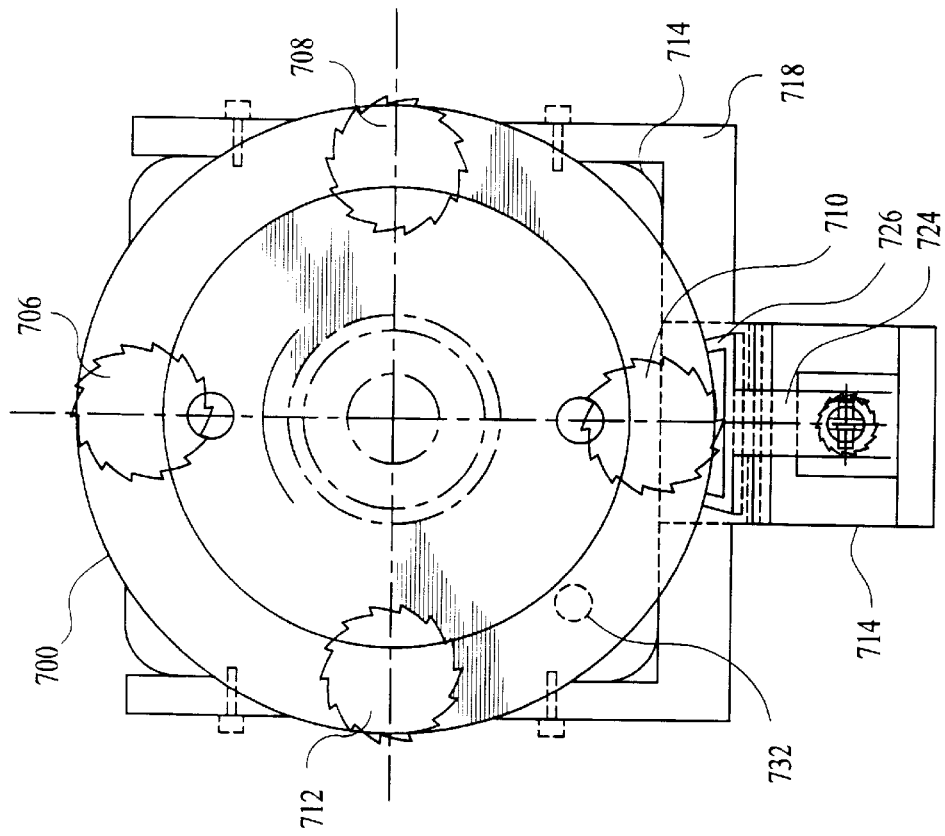
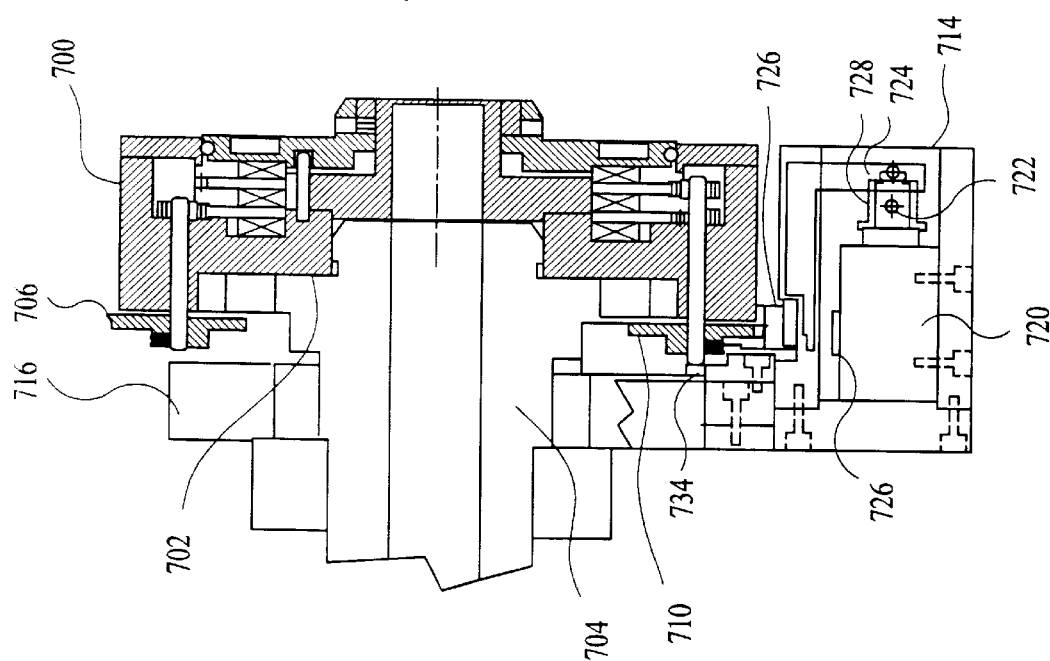
FIG. 27
FIG. 26

APPARATUS AND METHOD FOR AUTOMATICALLY COMPENSATING FOR LATERAL RUNOUT

CROSS REFERENCE TO RELATED APPLICATIONS

This application is a continuation-in-part of U.S. application Ser. Nos. 08/706,512, now U.S. Pat. No. 5,794,878, and 08/706,514, filed Sep. 4, 1996, and incorporated by reference.

TECHNICAL FIELD

The invention relates to on-car brake lathes.

BACKGROUND

A brake system is one of the primary safety features in every road vehicle. The ability to quickly decelerate and bring a vehicle to a controlled stop is critical to the safety of the vehicle occupants and those in the immediate vicinity. For this reason, a vehicle braking system is designed and manufactured to exacting specifications and is subject to rigorous inspection.

Disc brake assemblies, which are typically mounted on the front wheels of most passenger vehicles, are primary components of a brake system. Generally, a disc brake assembly includes a caliper that cooperates with a brake hydraulic system, a pair of brake pads, a hub, and a rotor. The caliper supports and positions the pair of brake pads on opposing sides of the brake rotor. In a hubless brake rotor (i.e. when the rotor and hub are separate components), the rotor is secured to the vehicle hub with a series of bolts and a rotor hat. The rotor rotates with the hub about a vehicle spindle axis. When a vehicle driver depresses a brake pedal to activate the hydraulic system, the brake pads are forced together and toward the rotor to grip friction surfaces of the rotor.

Disc brake assemblies must be maintained to the manufacturer's specifications throughout the life of the vehicle to assure optimum performance and maximum safety. However, several problems have plagued the automotive industry since the inception of disc brakes.

A significant problem in brake systems is usually referred to as "lateral runout." Generally, lateral runout is the side-to-side movement of the friction surfaces of the rotor as the rotor rotates with the vehicle hub about a spindle axis. Referring to FIG. 1, for example, a rotor having friction surfaces on its lateral sides is mounted on a vehicle hub for rotation about the horizontal spindle axis X. In an optimum rotor configuration, the rotor is mounted to rotate in a plane Y that is precisely perpendicular to the spindle axis X. Generally, good braking performance is dependant upon the rotor friction surfaces being perpendicular to the spindle's axis of rotation X and being parallel to one another. In the optimum configuration, the opposing brake pads contact the friction surfaces of the rotor at perfect 90 degree angles and exert equal pressure on the rotor as it rotates. More typically, however, the disc brake assembly produces at least a degree of lateral runout that deviates from the ideal configuration. For example, a rotor often will rotate in a canted plane Y' and about an axis X' that is a few thousandths of an inch out of axial alignment with the spindle (shown in exaggerated fashion in FIG. 1). In this rotor configuration, the brake pads, which are perpendicular to the spindle axis X, do not contact the friction surfaces of the rotor along a constant pressure plane.

The lateral runout of a rotor is the lateral distance that the rotor deviates from the ideal plane of rotation Y during a rotation cycle. A certain amount of lateral runout is inherently present in the hub and rotor assembly. This lateral runout often results from defects in individual components. For example, rotor friction surface runout results when the rotor friction surfaces are not perpendicular to the rotor's own axis of rotation, rotor hat runout results when the hat connection includes deviations that produce an off center mount, and stacked runout results when the runouts of the components are added or "stacked" with each other. An excessive amount of lateral runout in a component or in the assembly (i.e., stacked runout) will generally result in brake noise, pedal pulsation, and a significant reduction in overall brake system efficiency. Moreover, brake pad wear is uneven and accelerated with the presence of lateral runout. Typically, manufacturers specify a maximum lateral runout for the friction surfaces, rotor hat, and hub that is acceptable for safe and reliable operation.

After extended use, a brake rotor must be resurfaced to bring the brake assembly within manufacturers' specifications. This resurfacing is typically accomplished through a grinding or cutting operation. Several prior art brake lathes have been used to resurface brake rotors. These prior art lathes can be categorized into three general classes: (1) bench-mounted lathes; (2) on-car caliper-mounted lathes; and (3) on-car hub-mounted lathes.

In general, bench-mounted lathes are inefficient and do not have rotor matching capabilities. To resurface a rotor on a bench-mounted lathe, the operator is first required to completely remove the rotor from the hub assembly. The operator then mounts the rotor on the bench lathe using a series of cones or adaptors. After the cutting operation, the operator remounts the rotor on the vehicle spindle. Even if the rotor is mounted on the lathe in a perfectly centered and runout-free manner, the bench lathe resurfacing operation does not account for runout between the rotor and hub. In addition, bench lathes are susceptible to bent shafts which introduce runout into a machined rotor. This runout is then carried back to the brake assembly where it may combine with hub runout to produced a stacked runout effect.

Similarly, caliper-mounted lathes have had limited success in compensating for lateral runout, and require time consuming manual operations. During a rotor resurfacing procedure, the brake caliper must be removed to expose the rotor and hub. Once this is done, the caliper mounting bracket is used to mount the on-car caliper-mounted lathe. Caliper-mounted lathes lack a "rigid loop" connection between the driving motor and cutting tools, and are unable to assure a perpendicular relationship between the cutting tools and the rotor. Nor does a typical caliper-mounted lathe have a reliable means for measuring and correcting lateral runout. Typically, such lathes use a dial indicator to determine the total amount of lateral runout in the disc assembly. This measurement technique is problematic in terms of time, accuracy, and ease of use.

On-car hub-mounted lathes, generally are the most accurate and efficient means for resurfacing the rotor. Such a lathe is disclosed in U.S. Pat. No. 4,226,146, which is incorporated by reference.

Referring now to FIG. 2, an on-car disc brake lathe 10 may be mounted to the hub of a vehicle 14. The lathe 10 includes a body 16, a driving motor 18, an adaptor 20, and a cutting assembly 22 including cutting tools 23. The lathe may be used with a stand or an anti-rotation post (not shown), either of which can counter the rotation of the lathe during a resurfacing operation. After the brake caliper is removed, the adaptor 20 is secured to the hub of the vehicle 14 using the wheel lug nuts. The lathe body 16 is then mounted to the adaptor 20, the orientation of which may be adjusted using adjustment screws 24.

The operator then determines the total amount of lateral runout and makes an appropriate adjustment. Specifically, the operator mounts a dial indicator 26 to the cutting head 22 using a knob 28. The dial indicator 26 is positioned to contact the vehicle 14 at one of its distal ends as shown in FIG. 2. Once the dial indicator 26 is properly positioned, the operator takes the following steps to measure and compensate for lateral runout:

(1) The operator mates the lathe to the rotor using the adaptor.

(2) The operator activates the lathe motor 18, which rotates the adaptor 20, the brake assembly hub, and the rotor. The total lateral runout of the assembly is reflected by corresponding lateral movement in the lathe body.

(3) The lateral movement of the lathe body is then quantified using the dial indicator 26. Specifically, the operator observes the dial indicator to determine the high and low deflection points and the corresponding location of these points on the lathe.

(4) Upon identifying the highest deflection of the dial indicator, the operator stops the rotation at the point of the identified highest deflection.

(5) The operator then adjusts the lathe to compensate for runout of the assembly. This is accomplished by careful turning of the adjustment screws 24. There are four adjustment screws. The screw or screws to be turned depend on the location of the high deflection point. Turning the screws adjusts the orientation of the lathe body with respect to the adaptor 20 (and therefore with respect to the rotor and hub) to mechanically compensate for the runout of the assembly. The operator adjusts the screws until the highest deflection point is reduced by half as determined by reference to the dial indicator 26.

(6) The operator activates the lathe motor 18 and observes the dial indicator 26 to again identify the highest deflection of the dial. If the maximum lateral movement of the lathe body, as measured by the needle deflection, is acceptable (i.e. typically less than ³⁄₁₀₀₀ of an inch) then mechanical compensation is complete and the lathe resurfacing operation can commence. Otherwise, further measurement and adjustment is made by repeating steps (1) to (6). The resurfacing operation is then performed by adjusting the tool holder 22 and cutting tools 23 to set the proper cutting depth.

Although the hub mounted on-car brake lathe was a considerable advance over prior brake lathes, its structure and the corresponding procedure for compensating for lateral runout of the disc brake assembly has practical limitations. First, the procedure requires a significant amount of time to determine and adjust for lateral runout of the brake assembly. Although the specific amount of time necessary will vary based upon operator experience, the time for even the most experienced operator is significant and can substantially increase the cost associated with rotor resurfacing. Second, the procedure requires extensive education and operator training to assure that proper mechanical compensation for lateral runout is accomplished. Moreover, the accuracy and success of measurement and adjustment of lateral runout will vary from operator to operator.

SUMMARY

In one general aspect, an on-car disc brake lathe system for resurfacing a brake disc of a vehicle brake assembly includes a lathe body with a driving motor, a cutting head operably attached to the lathe body, and a drive shaft. The system further includes an alignment system including an electronic controller, an input adaptor configured to rotate with the drive shaft, an output adaptor configured to rotate with the drive shaft, and at least one adjustment disc positioned between the input adaptor and the output adaptor. Axial alignment of the input adaptor relative to the output adaptor may be varied based on a rotational orientation of the adjustment disc. An adjustment mechanism changes the rotational orientation of the adjustment disc in response to commands from the electronic controller.

Embodiments may include one or more of the following features. For example, the adjustment mechanism may include a stop disc operable in a first state to follow the rotation of the drive shaft and operable in a second state to rotate relative to the rotation of the drive shaft to change the rotational orientation of the adjustment disc. The adjustment mechanism may include a stop mechanism associated with the stop disc and operable to move between a first position in which the stop disc operates in the first state and a second position in which the stop disc is caused to operate in the second state. The stop disc may include a pair of stop discs, with the first stop disc operating in the first state when the stop mechanism is in the first position, in the second state when the stop mechanism is in the second position at a first time, and in the first state when the stop mechanism is in the second position at a second time different from the first time. The second stop disc operates in the first state when the stop mechanism is in the first position and when the stop mechanism is in the second position at the first time, and operates in the second state when the stop mechanism is in the second position at the second time.

The system may include a second adjustment disc positioned between the input adaptor and the output adaptor. The axial alignment of the input adaptor relative to the output adaptor may be varied based on the rotational orientation of the adjustment discs relative to each other. A stop disc or a pair of stop discs may be associated with each adjustment disc. A single stop mechanism may be associated with all of the stop discs. Gear trains may be associated with the stop discs, and may be configured to follow the movement of the respective stop discs, and to cause movement of the adjustment discs.

The adjustment discs may be slant discs that each include a slanted surface. The adjustment discs may be arranged so that the slanted surfaces are opposed to each other in an abutting relationship.

The stop discs may be starwheels having protruding teeth. The stop mechanism may be operable to move between a first position in which the stop disc operates in the first state and a second position in which the stop disc is caused to operate in the second state. For example, the stop mechanism may include an electromagnetic element and a toothed catch member operable to engage at least one tooth of the starwheel. The controller may be configured to time actuation of the electromagnetic element such that the toothed catch moves into its first stop position to contact a specified tooth of the starwheel.

The system also may include a component for measuring lateral runout of a brake disc and providing the measurement to the electronic controller. The electronic controller may issue commands to the adjustment mechanism based on the measurement.

The systems and techniques provide automatic compensation for the lateral runout of a lathe apparatus with respect to a vehicle hub. To this end, the brake lathe system includes a runout measurement and control system that determines the runout of a disc brake assembly and directs a corrective signal to an automated control system to compensate for lateral runout. The techniques may also be used in other practical applications to align two concentrically attached rotating shafts.

To provide automatic compensation for lateral runout, a brake lathe includes an automatic alignment coupling that operates in response to a corrective signal to adjust the alignment of the lathe with respect to the vehicle to mechanically compensate for lateral runout. The automatic alignment mechanism may include one or more stop discs that rotate with the drive shaft of the lathe and that can be selectively stopped from rotating with the shaft by a stop mechanism. In response to such stopping, one or more adjustment discs are caused to rotate to adjust the relative position of the axis of the lathe with respect to the axis of the disc brake assembly. In this manner, the system compensates for and corrects lateral runout that exists between two concentrically attached rotating shafts. Other techniques may also be used to compensate for the lateral runout.

Other features and advantages will be apparent from the following description, including the drawings, and from the claims.

BRIEF DESCRIPTION OF DRAWINGS

FIGS. 10C and 10C-1 are front and cross-sectional views, respectively, of an adjustment disc of the automatic alignment apparatus of FIGS. 10A and 10B.

FIGS. 10D and 10D-1 are front and cross-sectional views, respectively, of a slant disc of the automatic alignment apparatus of FIGS. 10A and 10B.

FIGS. 22 and 22A are front and side views of a rotary infrared generator accelerometer.

FIGS. 23 and 23A are front and side views of a rotary accelerometer employing a magnetic spring.

FIGS. 24 and 24A are side and top views of a rotary accelerometer employing a magnetic spring and electrical heating.

FIGS. 26 and 28 are section side views of a runout adjustment mechanism.

FIGS. 27 and 29 are end views of the mechanism of FIG. 26.

DETAILED DESCRIPTION

Figure 1:
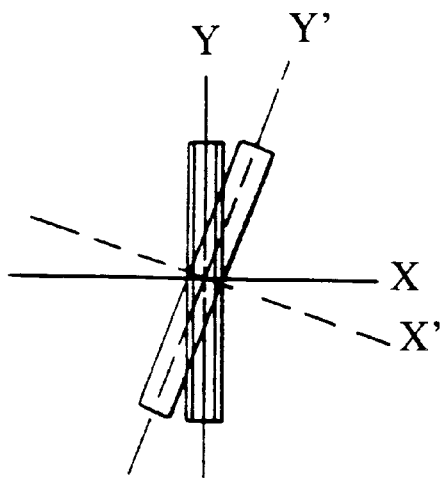
FIG. 1 is a graphical representation of a lateral runout phenomenon.
Figure 2:
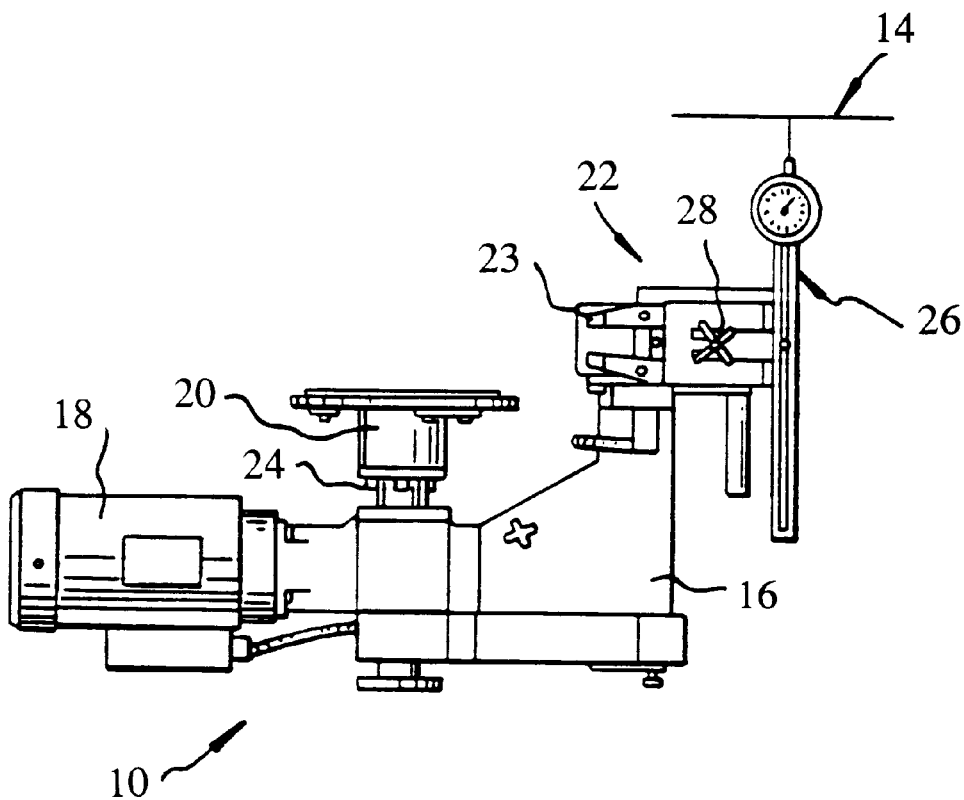
FIG. 2 is a plan view showing an on-car disc brake lathe and depicting a prior art procedure for measuring, and compensating for lateral runout of a disc brake assembly.
Figure 3:
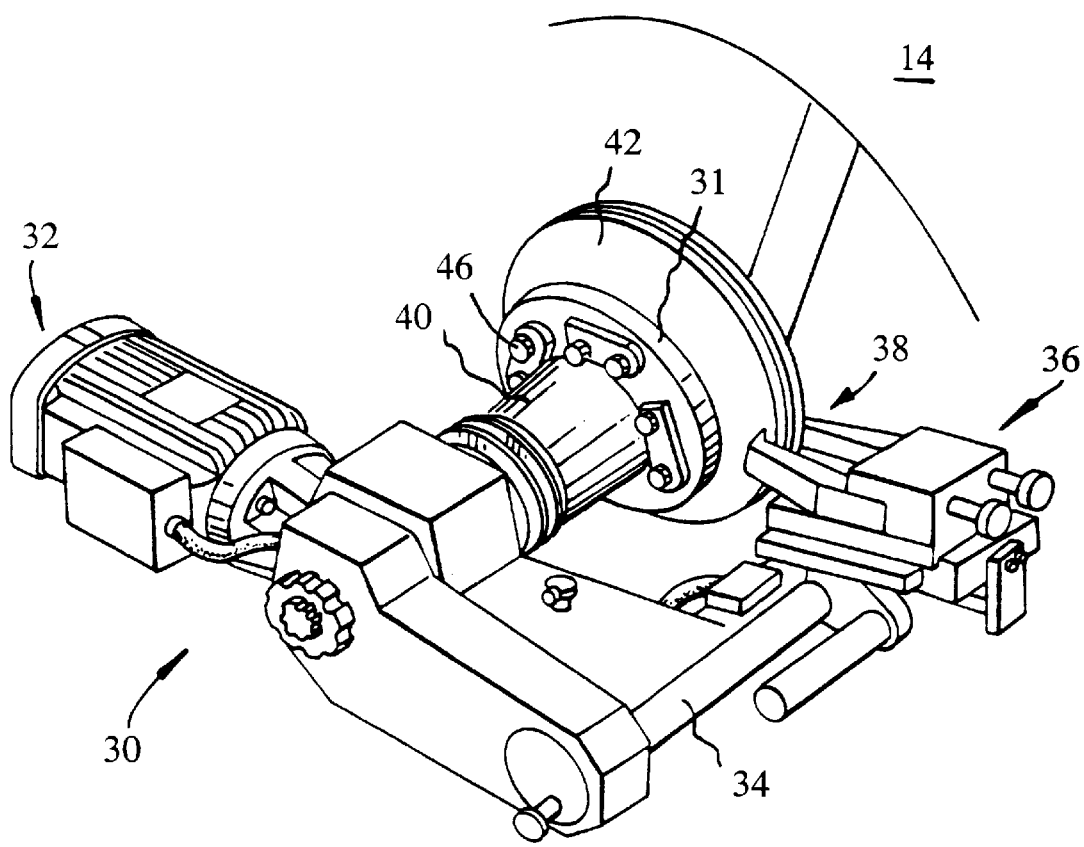
FIG. 3 is a perspective view showing an on-car disc brake lathe mounted on the hub of a vehicle in preparation for a disc resurfacing operation.

Referring to FIG. 3, an on-car disc brake lathe 30 is mounted to a hub 31 of a brake assembly of a vehicle 14. The brake lathe 30 includes a motor 32, a body 34, a cutting head 36 with cutting tools 38, and an adaptor 40. The vehicle disc brake assembly includes a rotor 42 operably attached to the hub 31. Typically, the attachment of the rotor 42 to the hub is through a rotor hat (not shown) formed in the rotor 42 (i.e., the rotor is a "hubless" rotor). However, an integral rotor and hub may occasionally be used in commercial vehicles. The adaptor 40 is mounted to the hub 31 of the vehicle using the lug nuts 46 normally used to secure the hub 31 to a wheel.

Figure 4:
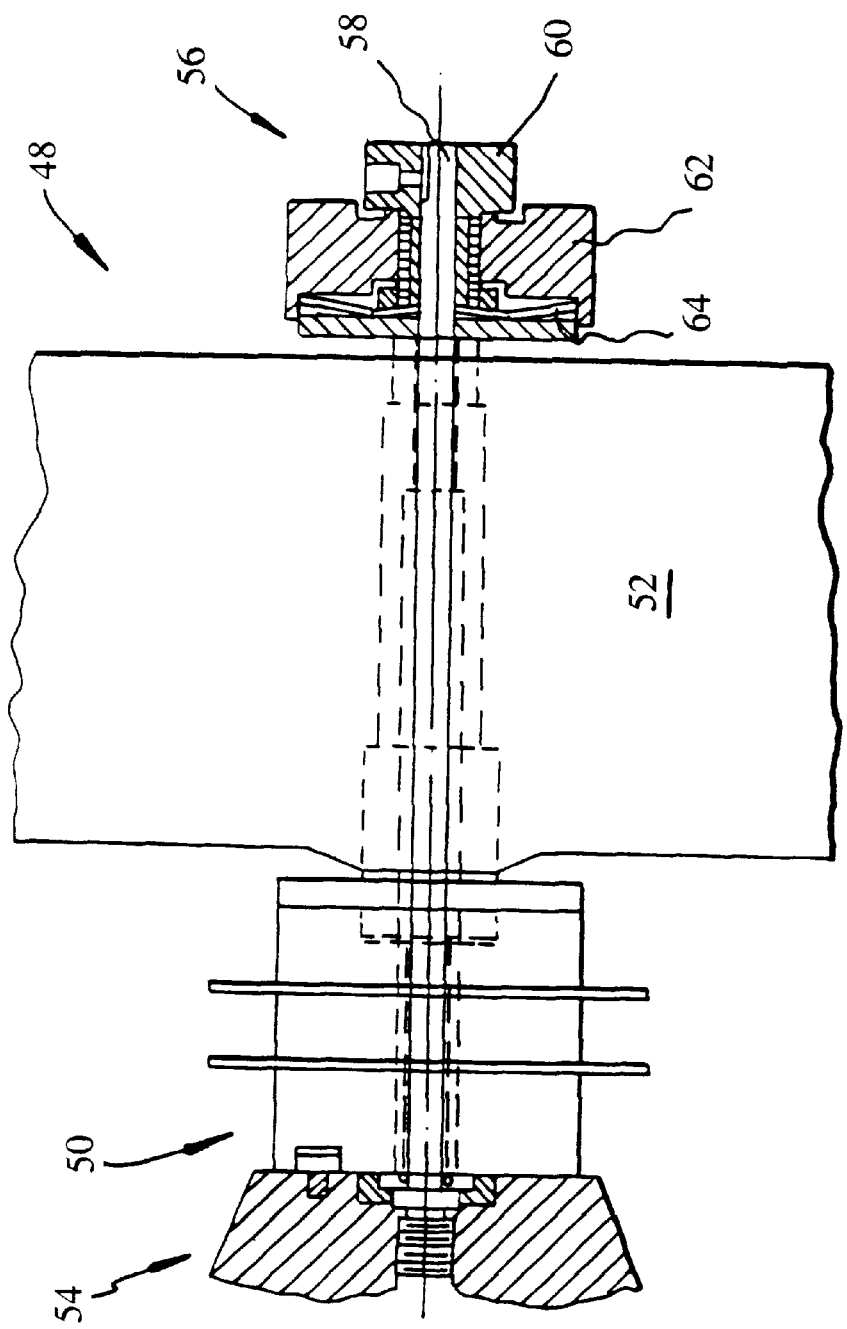
FIG. 4 is a partially sectional schematic view of a disc brake lathe with an automatic alignment apparatus.

FIGS. 4–9 illustrate a on-car disc brake lathe with an automatic alignment and compensation mechanism. Referring to FIG. 4, a lathe 48 includes an automatic alignment mechanism 50, a lathe housing or body 52, a hub adaptor 54, and a drawbar assembly 56. The hub adaptor 54 corresponds to the adaptor 40 of the lathe 30, and is used to connect the lathe 48 to the hub 31 of a vehicle 14. The drawbar assembly includes a drawbar 58 that extends through the body 52 and alignment mechanism 50. The drawbar 58 is operably connected to the adaptor 54 by a threaded connection (as shown) or the like. A calibration knob 60 is tightened during the automated alignment sequence of the lathe. After alignment is complete, a run knob 62 is tightened for the cutting operation. Spring 64 is a belleville washer that provides a loading force on bar 58 and the other components of the lathe.

Figure 5B:
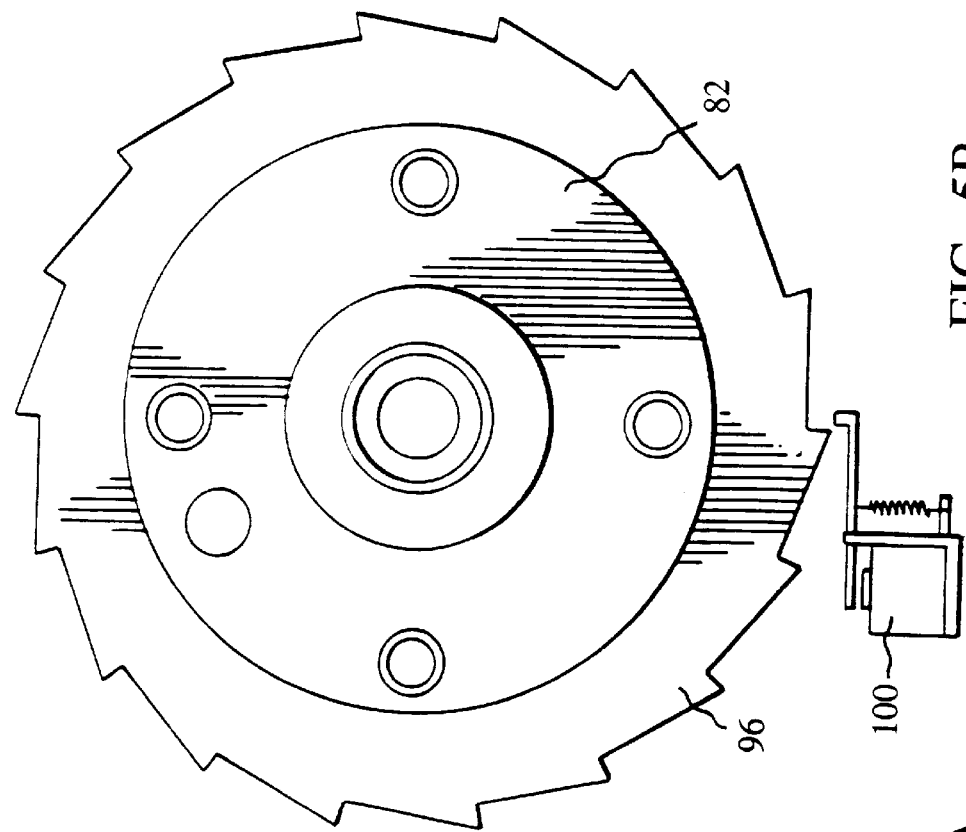
FIGS. 5A and 5B are cross-sectional and front views, respectively, of the automatic alignment apparatus of FIG. 4.
Figure 5A:
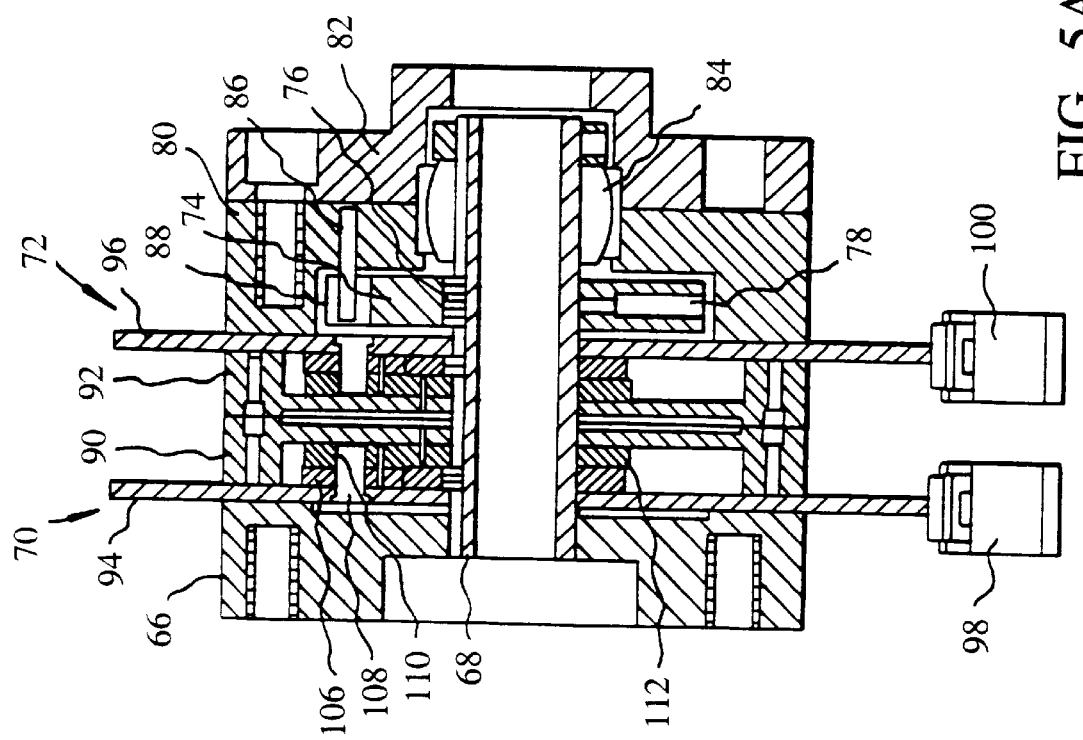

Referring to FIGS. 5A and 5B, the automatic alignment coupling 50 includes an input adaptor 66 operably attached to a rotating drive shaft of the lathe machine (shown in phantom in FIG. 4). A shaft 68 is attached to the input adaptor 66 such that the mounting face of the adaptor 66 is perpendicular to the shaft 68 axis so that shaft 68 runs true with the axis of the lathe machine.

Two slant or adjustment disc assemblies 70 and 72 are interposed between the input adaptor 66 and an alignment drive disc 74 which is attached to the shaft 68 and caused to rotate with the shaft by a key 76 and a set screw 78. A pivot plate 80 is operably attached to an output adaptor 82 and mounted to the shaft 68 by a spherical bearing 84 to permit the pivot plate 80 to pivot in relation to shaft 68 while being constrained from radial movement.

A pin 86, inserted into pivot plate 80, fits into a slot 88 at the periphery of the drive disc 74 and rotationally couples the pivot plate 80 to the shaft 68 and the input adaptor 66. As such, when the input adaptor 66 is mounted on the lathe machine's drive shaft and the output adaptor 82 is mounted on the automobile brake disc adaptor 54, the lathe machine output rotation causes the automobile brake disc adaptor 54 to rotate, which causes the brake disc to rotate.

The slant or adjustment disc assemblies 70 and 72, which are mirrors of each other, are placed between the input adaptor 66 and the output adaptor 82 as shown. The axial force produced by the axially mounted drawbar 58 causes the output adaptor 82 to be forced against slant disc assembly 72 and to assume an angle to the shaft 68 that depends upon the relative rotational positions of the slant discs 90 and 92, which are controlled using stop discs 94 and 96.

Control of the relative rotational positions of the slant discs 90 and 92 is accomplished while the lathe machine output shaft is driving the automobile brake disc hub. Specifically, by stopping the rotation of stop disc 94 or 96, its associated slant disc is caused to rotate in relation to the other slant disc, thus producing a change in angle of the output of the adjustment disc assemblies 70 and 72 and a corresponding change in the angle of the output adaptor 82. This causes a change in the angular alignment of the lathe machine axis and the automobile brake disc axis.

The stop discs 94 and 96 are selectively stopped by powering respective electromagnetic catches 98 and 100. The catches are controlled by a microprocessor system that operates in conjunction with a runout measurement and control mechanism described in more detail below. The lathe machine output shaft rotates at a speed that is too fast (for example, 123.14 RPM) to allow stop and release of a stop disc and associated slant disc for adjustment. As such, the rotation speed of the adjustment components is slowed using a gear train contained in each of the slant disc assemblies. The gear train extends the time permitted for adjustments in a given ½ revolution of the shaft 68 (i.e. the time it takes to stop the relative rotation of the slant discs in ½ revolution for maximum angular runout adjustment). For example, the time at a shaft rotation rate of 123.14 RPM extends from 0.243 seconds for ½ revolution of the shaft 68 to 3.297 seconds to permit easy and complete adjustment of the slant disc assemblies 70 and 72.

Figure 7B:
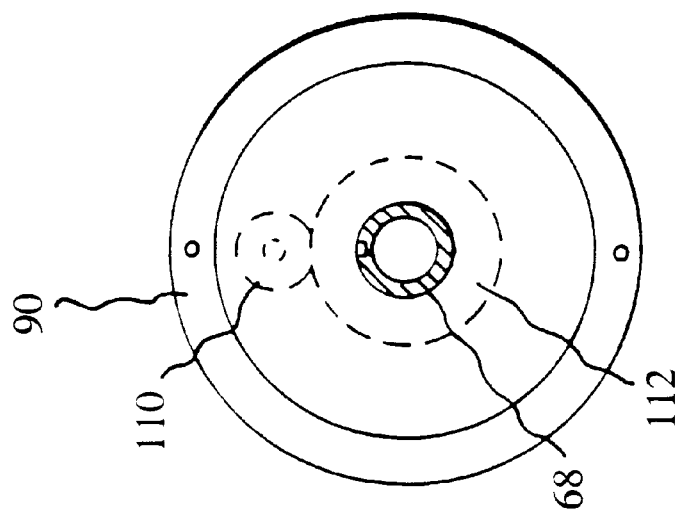
FIGS. 7A and 7B are front cross-sectional views of one of the adjustment disc assemblies of the automatic alignment apparatus of FIG. 4.
Figure 7A:
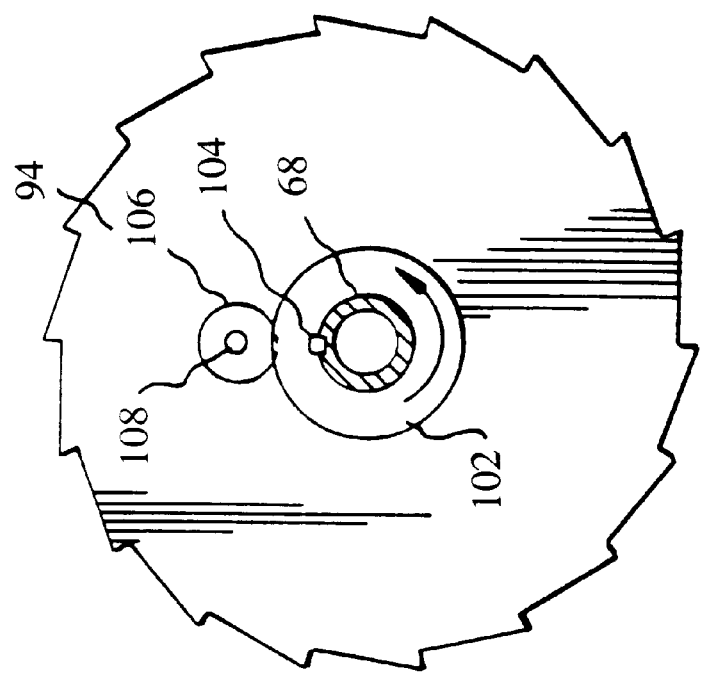
Figure 6:
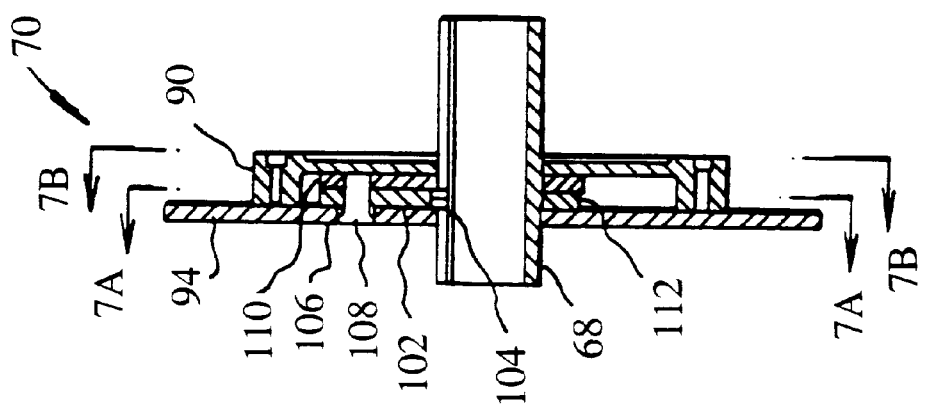
FIG. 6 is a cross-sectional view of the adjustment disc assemblies of the automatic alignment apparatus of FIG. 4.

Referring to FIGS. 6 and 7A, the gearing mechanism includes a gear 102 containing 88 teeth. Gear 102 is coupled to rotate with shaft 68 by a key 104. A gear 106 contains 38 teeth and is mounted on a pivot 108 formed on stop disc 94. Thus, when stop disc 94 is stopped by the electromagnetic catch 98, gear 106 rotates at a much faster rate than shaft 68. For example, if shaft 68 rotates at 123.14 RPM, gear 106 rotates at 285.166 RPM. A gear 110, also mounted on pivot 108, is provided with 36 teeth and is pinned to rotate with gear 106. Gear 110 is coupled to a gear 112 that is provided with, for example, 90 teeth. As such, gear 112 rotates at 114.06 RPM, or 92.6 percent of the rotational speed of shaft 68, and rotates backwards in relation to shaft 68 and slant disc 92. Because slant disc 90 is pinned to gear 112, it also moves backwards in relation to shaft 68. The gear arrangement and stop discs permit the adjustment of the slant disc assemblies, and therefore, the alignment of the lathe drive axis and the hub axis, without the need for a separate motor or power source. It is to be understood that the identified gear ratios and rotation speeds are practical examples and are not intended to limit the scope of the invention. When the stop disc 94 is released, the stop disc 94 and slant disc 90 again rotate at the rate of the shaft 68.

A stop pin 114 secured to slant disc 92 stops the relative rotation of the slant discs at ½ revolution, with stop disc 94 being parallel with stop disc 96 at one extreme and being positioned to provide maximum angular runout at the other extreme. By stopping the rotation of both stop discs 94 and 96, adjustment disc 90 and 92 remain fixed in relation to each other. Stopping the rotation of stop disc 94 alone until stop pin 114 couples to slant disc 90 causes stop disc 96, and thus output adaptor 82, to assume the maximum angular runout position.

Figure 9:
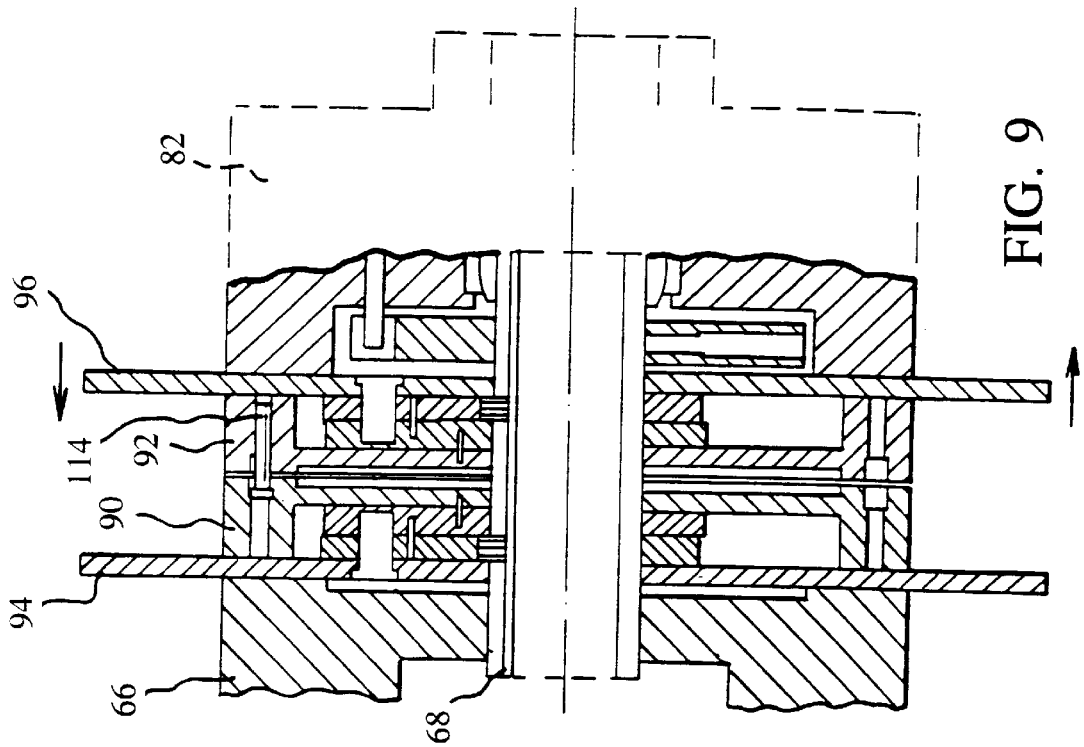
FIGS. 8 and 9 are cross-sectional views of the adjustment disc assemblies of the automatic alignment apparatus of FIG. 4.
Figure 8:
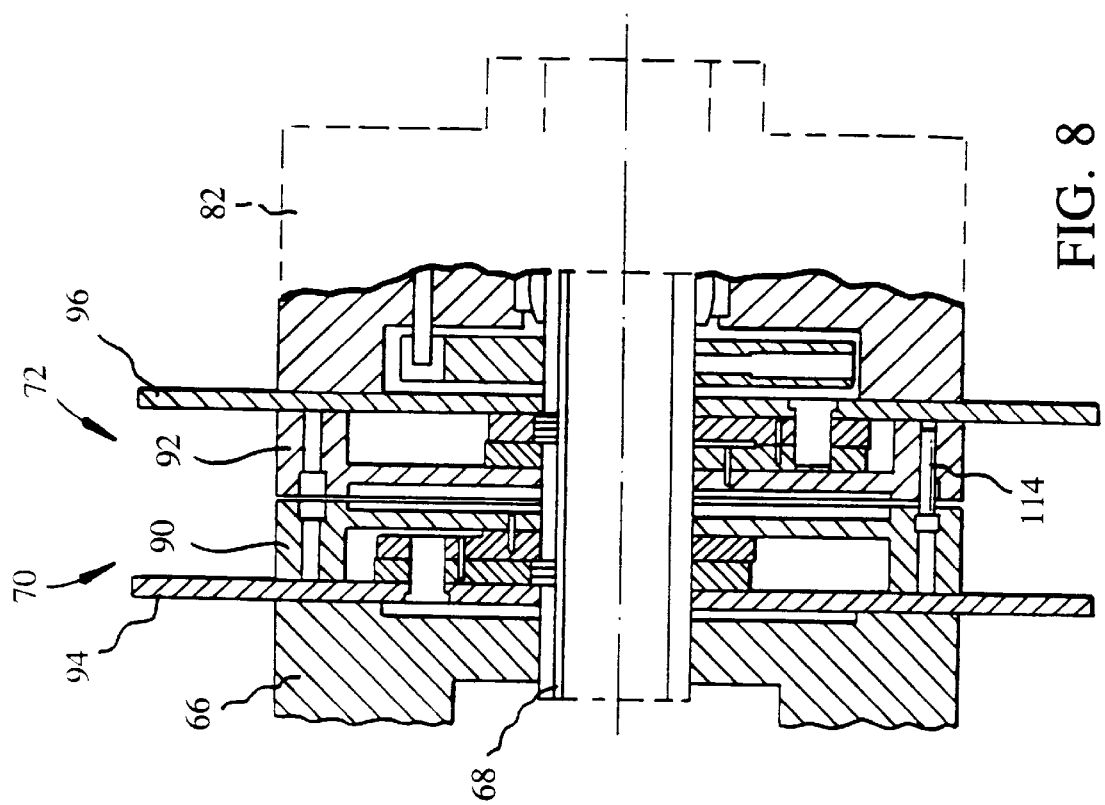

Referring to FIG. 8, the adjustment disc assemblies 70 and 72 and associated adjustment discs 90 and 92 are rotated in relation to each other so that the "slant" or wedge on respective interfaces complement each other and the input surface of the assembly is parallel with the output surface. This is accomplished by stopping the stop disc 94 until the pin 114 couples with the slant disc 90. Thus the output adaptor 82 "runs true" to the input rotation axis. The angle of the interface of the two slant discs has been exaggerated in the figures for clarity. The angle is of a dimension that depends on the application of the lathe, but may be on the order of 0.323 degrees. It is noted that because the input adaptor 66 is solidly mounted to the shaft 68 and its face is perpendicular to the axis of rotation, the adaptor 66 serves as a positioning reference to the slant disc assembly 70. Referring to FIG. 9, the slant disc assemblies 70 and 72 are rotated in relation to each other by stopping the stop disc 96 until the pin 114 couples to the slant disc 90. In this position, the slant angles on the two slant discs add to each other to cause the output surface of the assembly and the output adaptor 82 to display maximum angular runout with the input rotation axis.

The runout caused by a misalignment between the vehicle's hub axis and the axis of the lathe can be corrected without the time consuming and inaccurate manual methods of the prior art. Additional adjustment motors are not necessary. Accurate and automated realignment is possible when the system is operated in conjunction with a measurement and control system of the type described below.

Another implementation incorporates the fundamental features of the implementation disclosed above, but permits adjustment with only one slant disc. The output pivots in one selectable axis only when driven by the slant disc. In the implementation described above, the compensation vector (explained in more detail with reference to FIGS. 11A and 11B) necessary to adjust the angle of the output adaptor 82 could potentially require adjustment of two slant discs. The fixed pivoting axis of this implementation eliminates this problem by requiring only one adjustment, and, potentially, reduces the time required for shaft alignment.

Figure 10B:
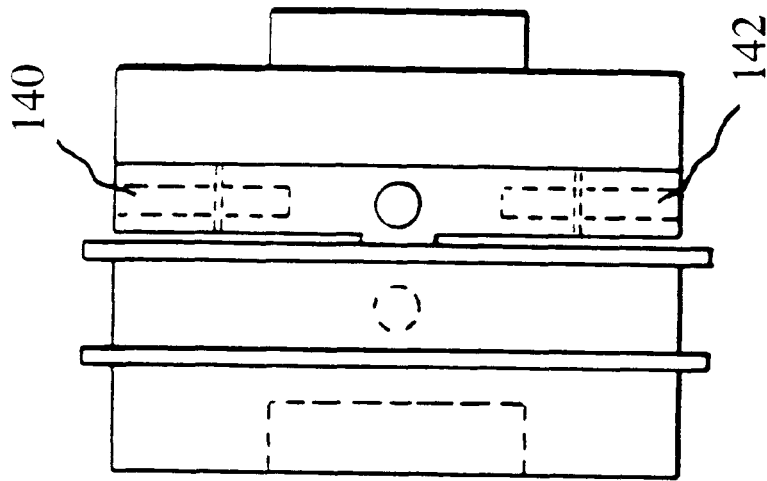
FIGS. 10A and 10B are cross-sectional and side views, respectively, of an automatic alignment apparatus.
Figure 10A:
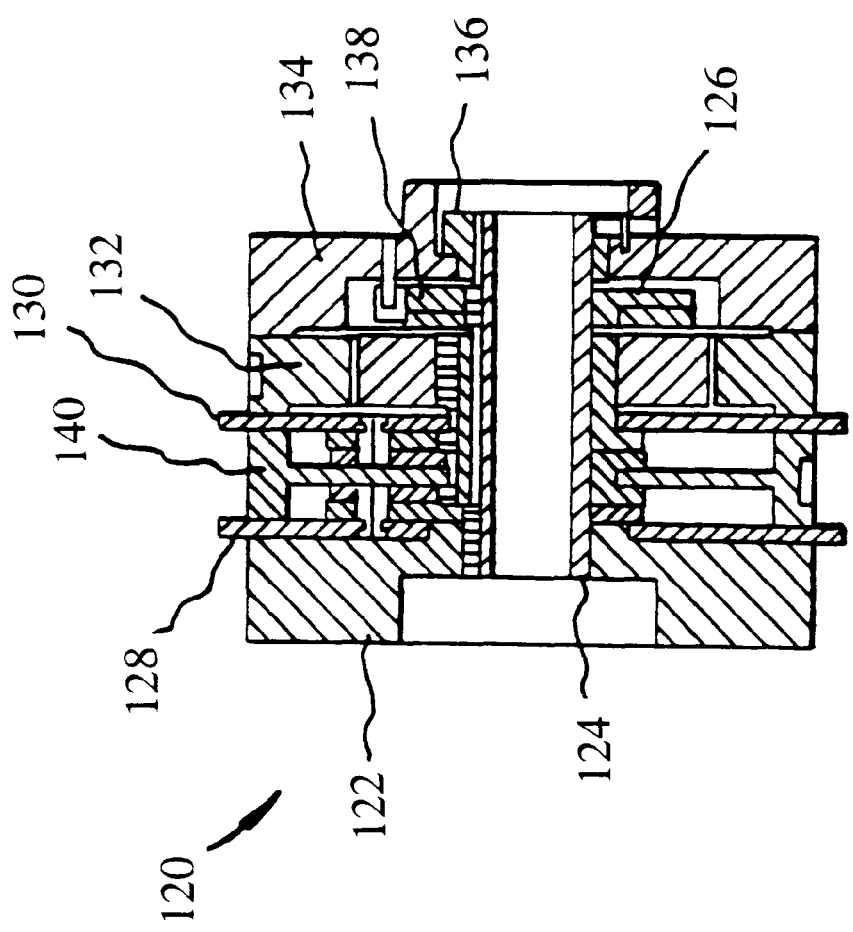

Referring to FIG. 10A, an automatic alignment coupling or mechanism 120 occupies the same position of the mechanism 50 shown in FIG. 4. Input adaptor 122 attaches to the rotating shaft of the lathe machine. Shaft 124 is attached to the input adaptor 122 such that the adaptor 122 mounting face is perpendicular to the shaft 124 so that shaft 124 runs true with the lathe machine axis. A second shaft 126 is placed over the shaft 124. The rotated position of the second shaft 126 relative to shaft 124 is controlled by the stop disc assembly 128. The stop disc assembly 128 contains a gear train and operates similarly to the stop disc assemblies 70 and 72. However, in this case, instead of driving a slant disc when the stop disc 130 is stopped by an electromagnetic catch, the second shaft 126 is driven and moves backwards relative to the shaft 124. Rotary movement of the shaft 126 also controls the rotary position of a pivot ring assembly 132 which is firmly attached to the second shaft 126. An output adaptor 134 is mounted on the shaft 124, held in place by a clamp ring 136, and caused to rotate with the shaft 124 by a drive disc 138.

A second stop disc assembly 130, including a gear train, is mounted on the second shaft 126 and operates similar to stop discs 94 and 96. The output of the gear train drives a single slant disc 140 as shown in FIG. 10C. When stop disc 130 is stopped, the slant disc 140 moves backward in relation to shaft 124. The axial force produced by an axially mounted drawbar 58 (FIG. 4) causes the output adaptor 134, through the pivot ring 132, to assume an angle to the shaft 124 depending upon the rotated position of slant disc 140.

Referring to FIG. 10B, the automatic alignment mechanism may be rotated 90 degrees counterclockwise about the input axis of FIG. 10A. The pivot ring 132 does not rest against the stop disc assembly 130 over its entire surface. Rather, there are two bumps diametrically placed on the face of the pivot ring 132 which rests against the stop disc assembly 130. This allows the slant disc 140 to transmit its angle to the pivot ring 132 but allows the pivot ring 132 to pivot on its fixed axis pins 142. Thus, once set, the compensation vector for alignment does not change when the slant disc 140 varies the output compensation angle. FIG. 10D shows the pivot ring assembly 132 in more detail. Specifically, by making one of the bumps on the pivot ring 132 a certain amount larger than the other, the pivot ring 132 is made to be perpendicular to the shaft 124 at one extreme position of slant disc 140 and to be at the maximum compensation angle at the other extreme. A ½ degree variance, for example, is provided between the bumps as shown in FIG. 10D. Similarly, a ½ degree variance between the bumps on slant disc 140 is provided as shown in FIG. 10C. Thus, when the slant disc 140 and the pivot ring 132 are placed against the disc 130 with the ½ degree face angles complementing each other, a 0 degree runout between the input and output adaptors is achieved. On the other hand, when the discs are rotated 180 degrees relative to each other, the angles oppose each other and the runout is 1 degree.

Figure 11B:
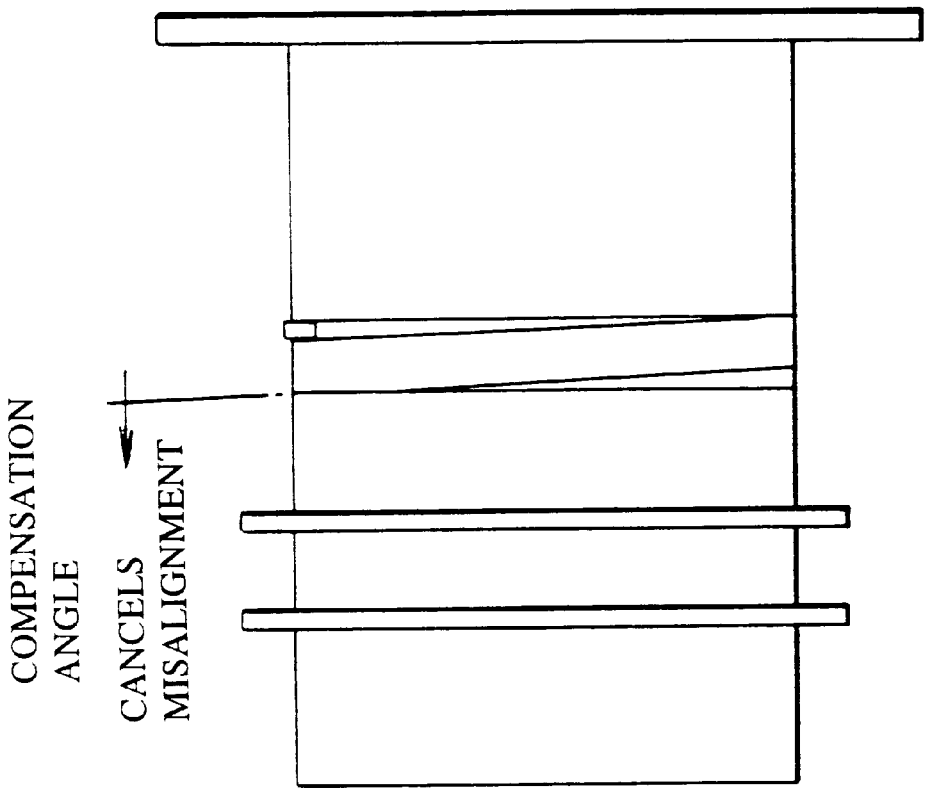
FIGS. 11A and 11B are schematic representations of the compensation vector and compensation alignment angle of the automatic alignment apparatus of FIGS. 10A and 10B.
Figure 11A:
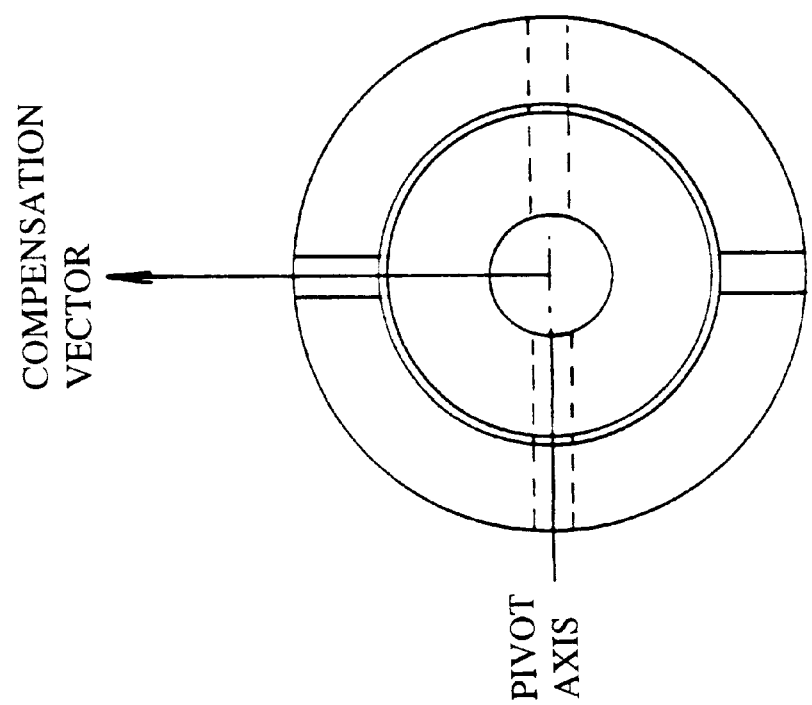

FIGS. 11A and 11B depict the relationship between the compensation vector, compensation angle, and pivot axis. Generally, two parameters are of importance when aligning the rotating shafts of the lathe and brake hub. The first parameter, referred to as the compensation vector, is defined by the rotation position at which the lateral runout deflection of the brake lathe is the greatest. The second parameter, referred to as the compensation angle, is defined by the angle that the input adaptor and the output adaptor must assume in relation to each other to compensate for this lateral runout. The compensation vector and the compensation angle can be adjusted separately as shown in FIG. 10A.

Figure 12:
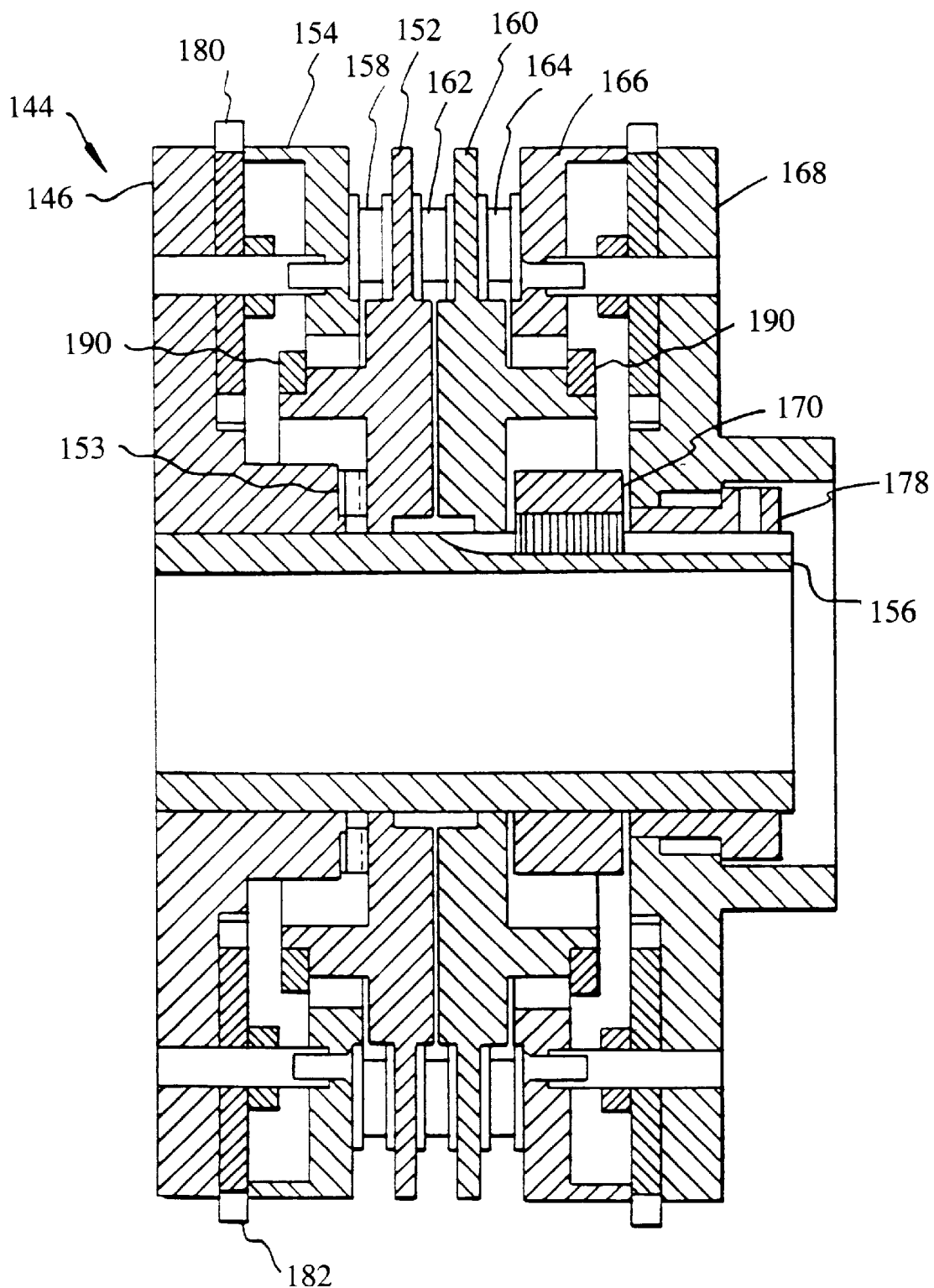
FIG. 12 is a cross-sectional view of an automatic alignment apparatus.

In the implementations of FIG. 4 and FIG. 12 (described below), the compensation vector is adjusted by stopping simultaneously the input disc and output disc. This does not affect the relative rotational positions of the discs and thus does not change the input to output angle. Rather, adjustment of the compensation vector only changes the rotational position at which the disc's angle changing capability is effective. The compensation angle is adjusted by stopping the output disc only, which rotates it in relation to the input disc and thus changes the input-to-output angle.

FIGS. 12–16 show another implementation that is similar to the first implementation, but differs in that the slant discs are separated from each other and from the input and output adaptors by pin roller thrust bearings to allow free rotation of these elements under normal axial pressure. The rotational positioning of the slant discs relative to each other and to the input and output adaptors is performed by actuating four starwheels which drive the slant discs through gear trains. In addition, forward and reverse positioning capability of the slant discs is provided, which allows a considerable decrease in time to final alignment.

Referring to FIG. 12, an automatic alignment coupling or mechanism 144 occupies the same position of the mechanism 50 shown in FIG. 4. An input adaptor 146 attaches to and is rotationally driven by the output shaft of the brake lathe. Adaptor 146 contains two starwheels 180 and 182 that drive gear trains to position an input slant disc 152, which is described in more detail with reference to FIG. 13A. An adaptor cover 154 serves as a cover for the gearing and as a bearing surface that runs perpendicularly true to the shaft 156, which is attached to input adaptor 146.

Thrust bearing assembly 158 is placed between input slant disc 152 and the bearing surface of adaptor cover 154. This bearing assembly allows free rotation of the slant disc 152 relative to the input adaptor 146 and the attached shaft 156 while automatic alignment mechanism is under axial pressure in normal operation. Output slant disc 160 is separated from slant disc 152 by a thrust bearing assembly 162 identical to thrust bearing assembly 158 to allow output slant disc 160 to freely rotate under axial pressure. A third thrust bearing assembly 164 is placed between output slant disc 160 and the output adaptor cover 166, to allow free rotation of the output slant disc 160.

Output adaptor 168 contains a starwheel and gearing assembly comparable to that of input adaptor 146. It differs in that it is free to move to an angle that varies as much as 1 degree, for example, from perpendicular to the shaft 156 axis. Output adaptor 158 is rotationally coupled to the shaft 156 by means of a drive arm 170 that is keyed to the shaft 156.

Figure 13A:
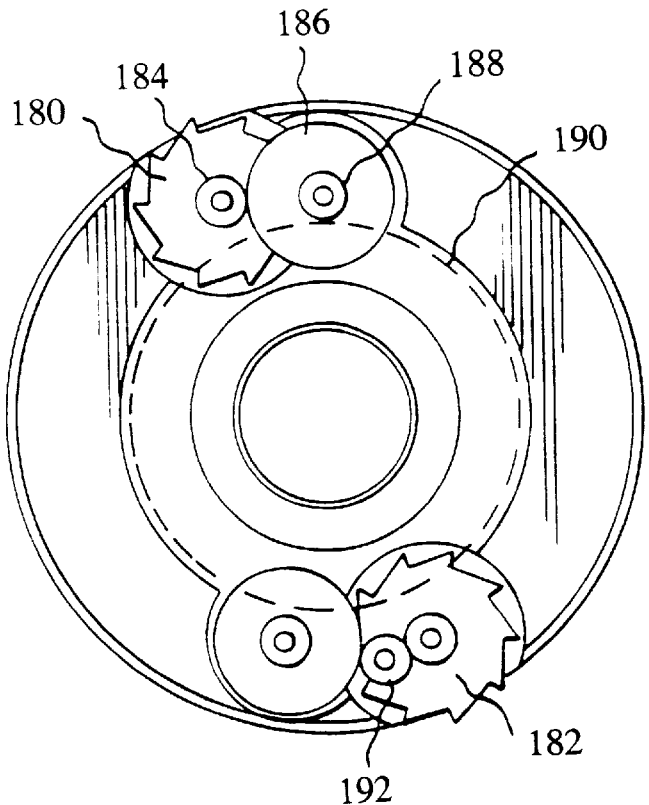
FIGS. 13A and 13B are front views of input and output adaptor assemblies and a front view of the drive arm assembly, respectively, of the automatic alignment apparatus of FIG. 12.
Figure 13B:
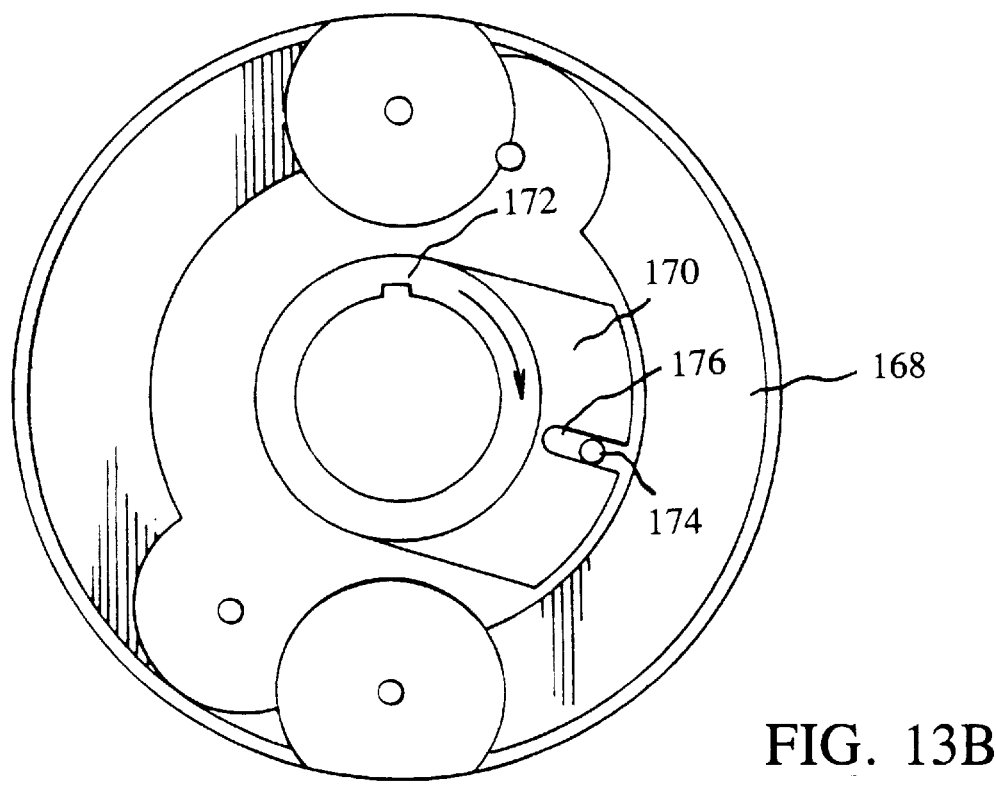

FIG. 13B shows the input side of the output adaptor 168 without the starwheel and gears. The drive arm 170 is shown in place with key 172 coupling it to the shaft 156. A drive pin 174 is positioned in the output adaptor 168 and fits in the slot 176 of the drive arm 170 to cause the output adaptor 168 to rotate with the shaft 156 while allowing the output adaptor 168 to tip angularly in relation to the shaft 156.

Referring to FIG. 12, a collar 178 serves as both a bearing surface for the inside diameter of output adaptor 168 and a shoulder to prevent disassembly of the parts when the automatic alignment mechanism is not operating under axial pressure. A wave washer 153 or the like is placed between input slant disc 152 and input adaptor 146 to provide some friction so that rotation of output slant disc 160 will not cause unwanted rotation of the input slant disc 152.

Referring to FIG. 13A, input and output adaptor assemblies preferably include a forward starwheel 180 that is coupled to a gear 184 having, for example, 18 teeth. Gear 184 meshes with a gear 186 having, for example, 56 teeth. Gear 186 is coupled to gear 188 having, for example, 18 teeth. Gear 188 meshes with a ring gear 190 having, for example, 140 teeth. The ring gear 190 is operably attached to a respective slant disc 152 or 160 as shown in FIG. 12.

Referring again to FIG. 13A, when the entire automatic alignment mechanism rotates at 2.05 RPS, for example, in normal operation, the starwheel 180 can be caused to rotate by catching one or more teeth as the starwheel 180 passes by a fixed stop mechanism comprising an electromagnetic catch or the like. Thus, a slant disc can be caused to rotate in increments relative to the automatic alignment mechanism. The reverse starwheel 182 and gear assembly operate similarly to the forward starwheel 180 and gear assembly except that an additional gear 192 causes the slant disc to rotate in the opposite direction when the starwheel 182 is rotated.

Figure 14:
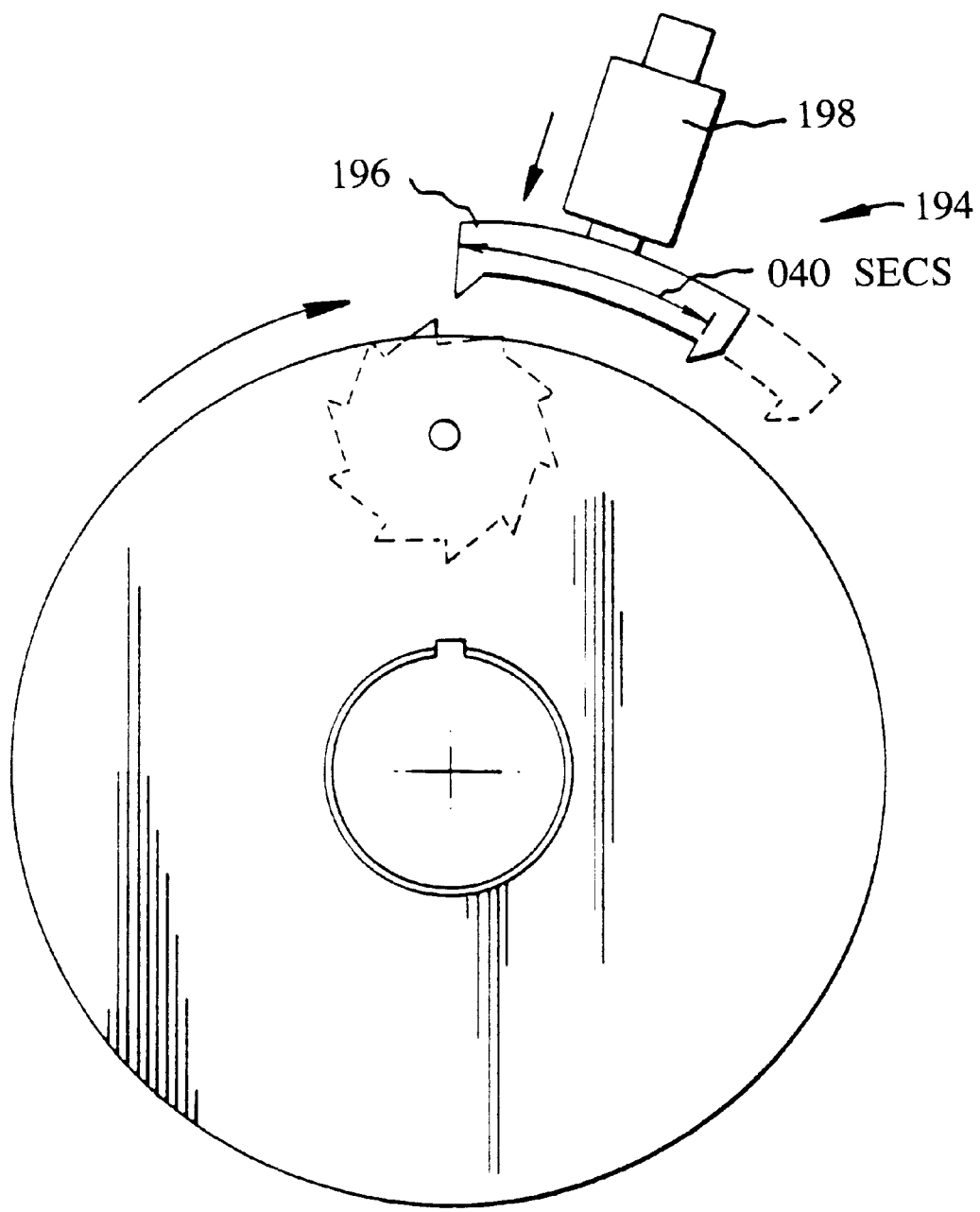
FIG. 14 is a front view of a starwheel stop mechanism of the automatic alignment apparatus of FIG. 12.
Figure 15:
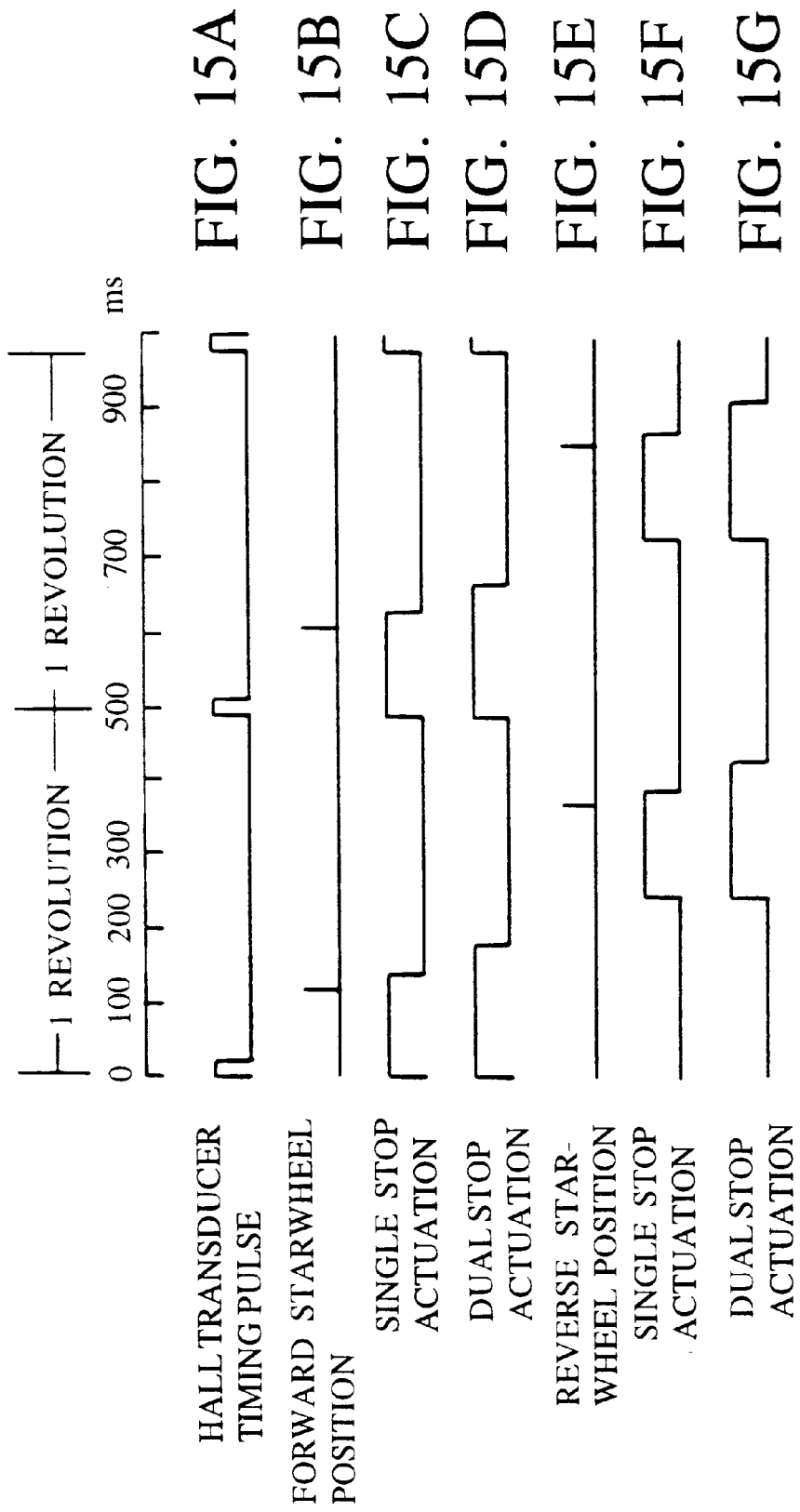
FIG. 15A is a timing diagram of the hall transducer timing pulse during the starwheel stop operation of the automatic alignment apparatus of FIG. 12.
FIG. 15B is a timing diagram of the forward starwheel position during the starwheel stop operation of the automatic alignment apparatus of FIG. 12.
FIG. 15C is a timing diagram of the forward starwheel single stop actuation during the starwheel stop operation of the automatic alignment apparatus of FIG. 12.
FIG. 15D is a timing diagram of the forward starwheel dual stop actuation during the starwheel stop operation of the automatic alignment apparatus of FIG. 12.
FIG. 15E is a timing diagram of the reverse starwheel position during the starwheel stop operation of the automatic alignment apparatus of FIG. 12.
FIG. 15F is a timing diagram of the reverse starwheel single stop actuation during the starwheel stop operation of the automatic alignment apparatus of FIG. 12.
FIG. 15G is a timing diagram of the reverse starwheel dual stop actuation during the starwheel stop operation of the automatic alignment apparatus of FIG. 12.

Referring to FIG. 14, a starwheel stop mechanism 194 includes a toothed catch member 196 and a magnetic element such as solenoid 198 or the like. One stop mechanism 194 may be provided to operate in conjunction with the input adaptor 146 and another may be provided to operate in conjunction with the output adaptor 168. The toothed member 196 may contain one or more teeth so as to catch one or more starwheel teeth during each rotation of the automatic alignment mechanism. Note that the teeth of the member 196 are spaced apart so as to allow time to lift the toothed member between starwheel contact to control the amount of starwheel rotation per rotation of the automatic alignment mechanism.

As the starwheels on each adaptor 146 and 168 are in line, the action of the starwheel catch or stop mechanisms have to be timed in synchronism with the rotation of the automatic alignment mechanism so that only the desired starwheel (i.e., forward starwheel 180 or reverse starwheel 182) is actuated.

FIGS. 15A–15G show exemplary timing control diagrams for the starwheel stop mechanism 194. As shown, a hall transducer or the like produces a timing pulse that is used as a time reference point.

Figure 16:
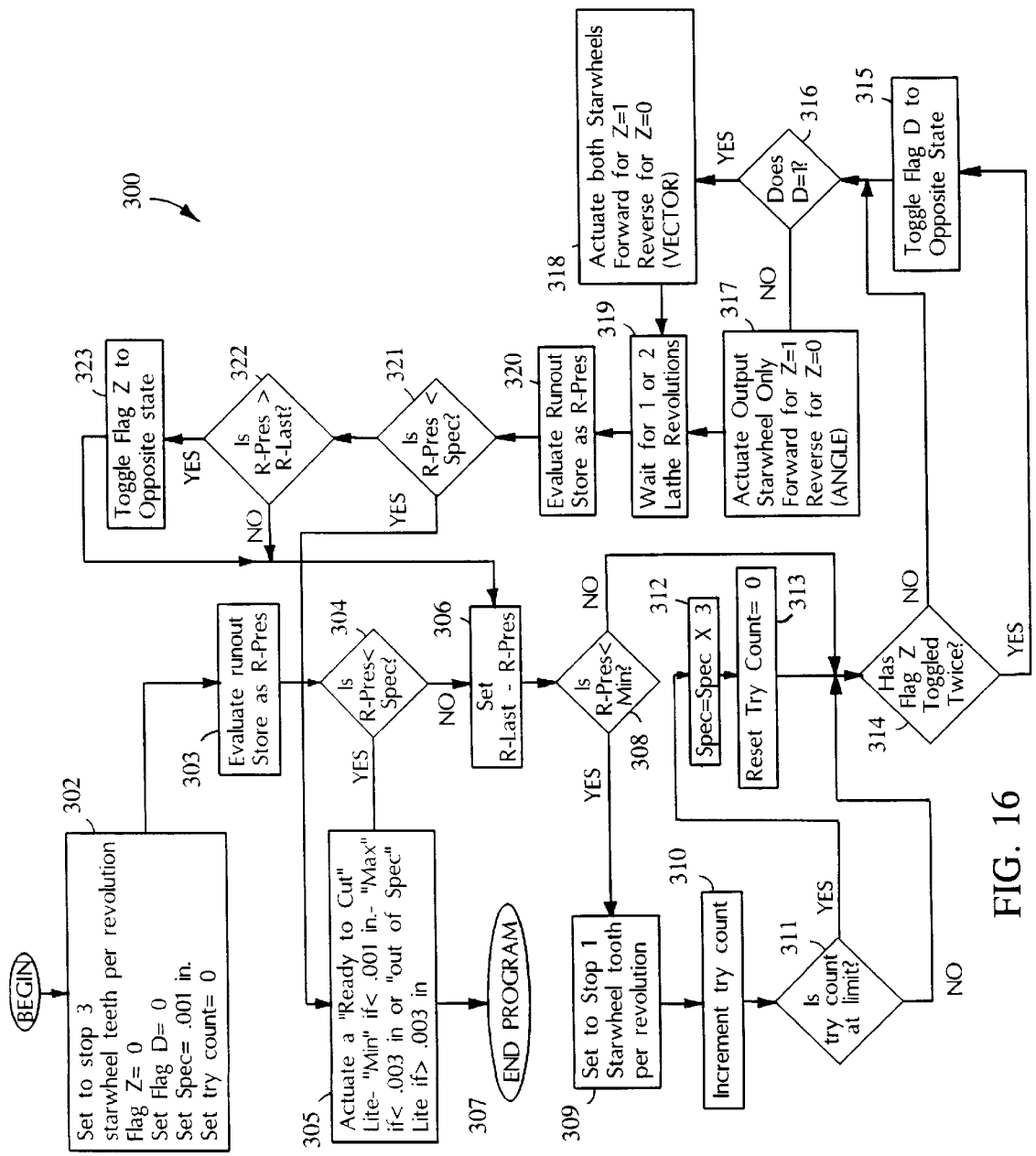
FIG. 16 is a flow diagram of an automatic alignment operation using the automatic alignment apparatus of FIG. 12.

Referring to FIG. 16, alignment may be achieved according to a procedure 300. It is noted that any suitable measurement device could be used in conjunction with the alignment mechanism. Preferably, however, the sensing and measuring device described below operates in conjunction with the alignment mechanisms described above. It is also noted that although the alignment process is shown and described in FIG. 16 with reference to the implementation of FIG. 12, the general process algorithm is applicable to all of the described implementations. Furthermore, the alignment apparatus and process may also be advantageously used in other practical applications to align two concentrically rotating shafts.

In general, the flow diagram of FIG. 16 shows a sequence of trial and error adjustments wherein an adjustment is initially made by stopping a starwheel on one of the adaptors and measuring the change in the runout or alignment. If the runout improves, an additional adjustment is ordered in the same direction. If the alignment worsens, an adjustment in the opposite direction is ordered. This process is repeated until the alignment is corrected to within specifications and the lathe shaft and hub axes are aligned. Two distinct periods of adjustment are employed. In a first cycle, large adjustments are made in the orientation of slant discs 152 and 160 to more significantly change the alignment of the shaft and hub axes to correct runout. Once alignment reaches a predetermined low level, finer adjustments are made to correct runout to within specified tolerances.

The runout correction process begins with initialization of several variables (step 302). First, the stop level of stop mechanism 194 is set to three actuations of the starwheels. This provides the large movements of slant discs 152 and 160 at the beginning of the adjustment cycle. In addition, several internal counts and limits are initialized including flag Z, flag D, and a try counter. Also, the initial specification value is set to represent an acceptable level of runout. Typically, this value is set to be in the order of 0.001 inches. The try counter operates when runout drops to a "Min" value. This counter causes the value of "Spec" to increase after the system unsuccessfully tries to reach the present "Spec" runout value a programmed number of tries or cycles. This prevents the system from trying to forever reach a runout value that is impossible given the circumstances.

After initializing the variables, an initial evaluation of the runout is made and stored as R-pres (step 303), which is representative of a base value of the runout. The measured runout then is compared with a runout measurement that conforms to specification (step 304), which, as noted above, is typically on the order of 0.001 inches. If the runout is less than 0.001 inches, the runout is determined to fall within specified tolerances ("Spec") and no further compensation is required. In this case, a "Ready to Cut" light or similar mechanism is actuated to indicate that compensation is complete (step 305) and the procedure ends (step 306).

If further compensation is required, the value of R-pres is copied into the memory location of R-last (step 307). Next, if R-pres does not exceed a predetermined "Min" level (step 308), the stop mechanism 196 is set to stop one tooth of the starwheel 180 or 182 per revolution (step 309), a try count is incremented (step 310), and the try count is evaluated to determine whether it is at a limit (step 311).

If the try count is at its limit, the runout "Spec" limit is raised (step 312) and the try count is reset to 0 (step 313). The higher "Spec" limit usually is a value that is still acceptable but less preferred than the original "Spec" limit (e.g. 0.001 inch). For example, a higher "Spec" of 0.003 inches is acceptable.

After resetting the try count (step 313), determining that the try count is not at the limit (step 311), or determining that R-pres is not less than the minimum (step 308), the flag Z is tested to determine if starwheel actuation has run in both directions (step 314). That is, whether both output 180 (forward) and 182 (reverse) starwheels have been activated. If the Z flag has been toggled twice, then flag D is toggled (step 315).

After toggling flag D (step 315) or determining that the Z flag has not been toggled twice (step 314), the state of flag D is determined (step 316). If D equals 0, then the output only starwheel is actuated to change the compensation angle of the system (step 317). If D equals 1, both the output and input starwheels are actuated to change the compensation vector of the system (step 318).

The system then waits for one of two revolutions of the lathe before proceeding (step 319) to allow transients introduced by the last starwheel adjustment to dissipate. The number of revolutions depends on the ability of the rotational motion sensor to track changes in the rotational motion.

Next, the runout is measured again and stored as R-pres (step 320). If the new runout is less than Spec (e.g., 0.001 or 0.003 inches) (step 321), the adjustment process is complete and the system proceeds with steps 305 and 306.

R-pres then is compared to R-last, the runout from the last measurement (step 322). If R-pres is not less than R-last, then flag Z is toggled to cause motion in the opposite direction (step 323). After toggling flag Z (step 323) or determining that R-pres is less than R-last (step 322), the system sets R-last equal to R-pres (step 307) and proceeds as discussed above.

In this manner, the system employs a trial and error approach to reducing runout. As long as the runout continues to decrease, additional actuations of the same starwheel occur. However, if runout worsens, the opposite starwheel is actuated to begin to correct the runout. If this forward and reverse cycle does not improve the runout, the compensation vector is adjusted by moving both of the input and output adjustment discs. A microprocessor and suitable circuitry controls the operation of the present invention as described below.

The alignment adjustment system is a substantial improvement over prior art devices and techniques. Once the appropriate sensor and measuring system is properly secured, the automatic alignment system provides for mechanical compensation of the total lateral runout present in the disc brake assembly. Specifically, the alignment system adjusts the alignment of the brake lathe component with respect to a vehicle hub to compensate for lateral runout. This, in turn, ensures that the cutting head 36 is placed perpendicular to the rotation axis of the hub 44.

Figure 17:
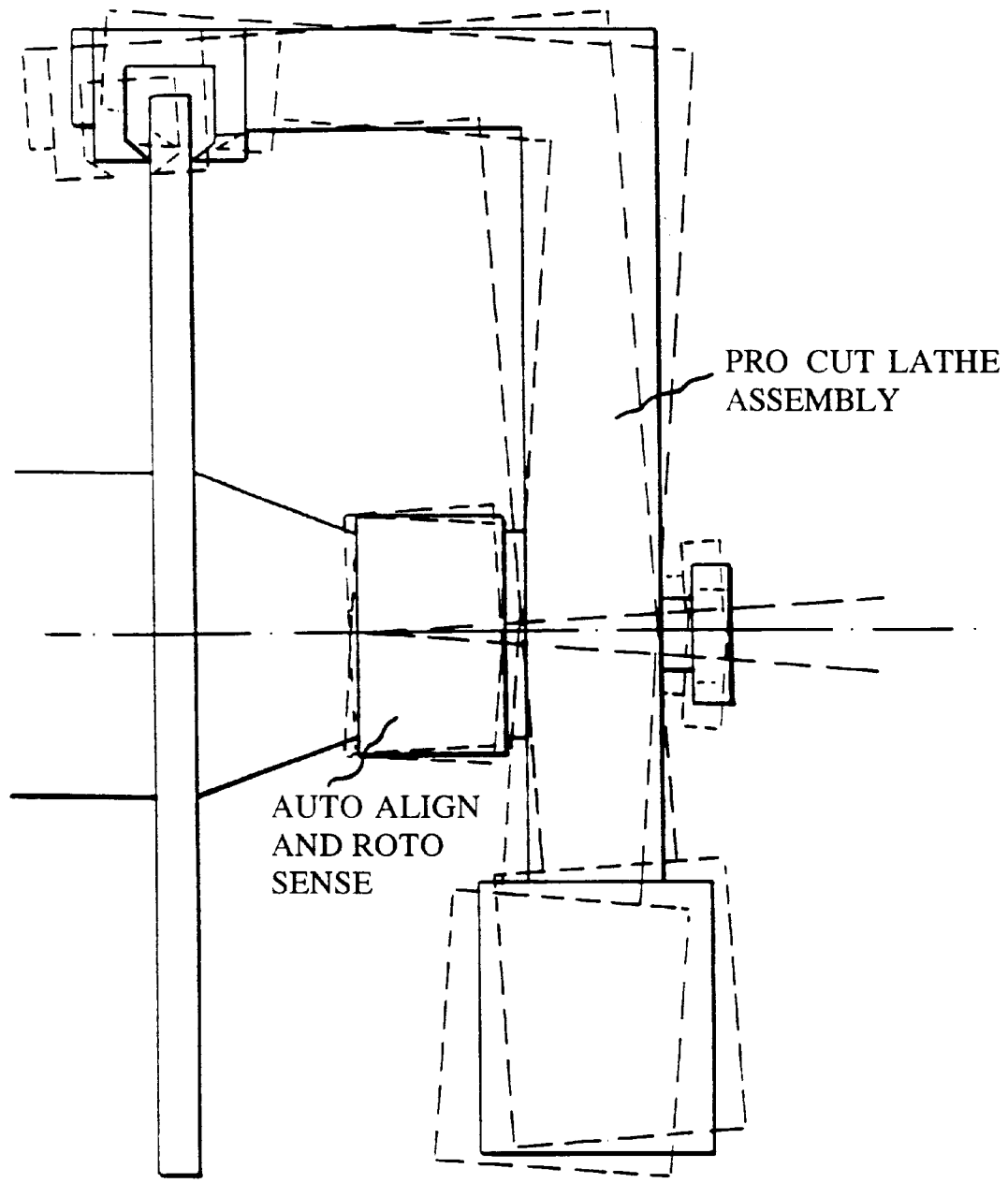
FIG. 17 is a schematic view of the rotational runout phenomenon occurring during a cutting operation of the on-car disc brake lathe mounted on the hub of a vehicle.
Figure 18:
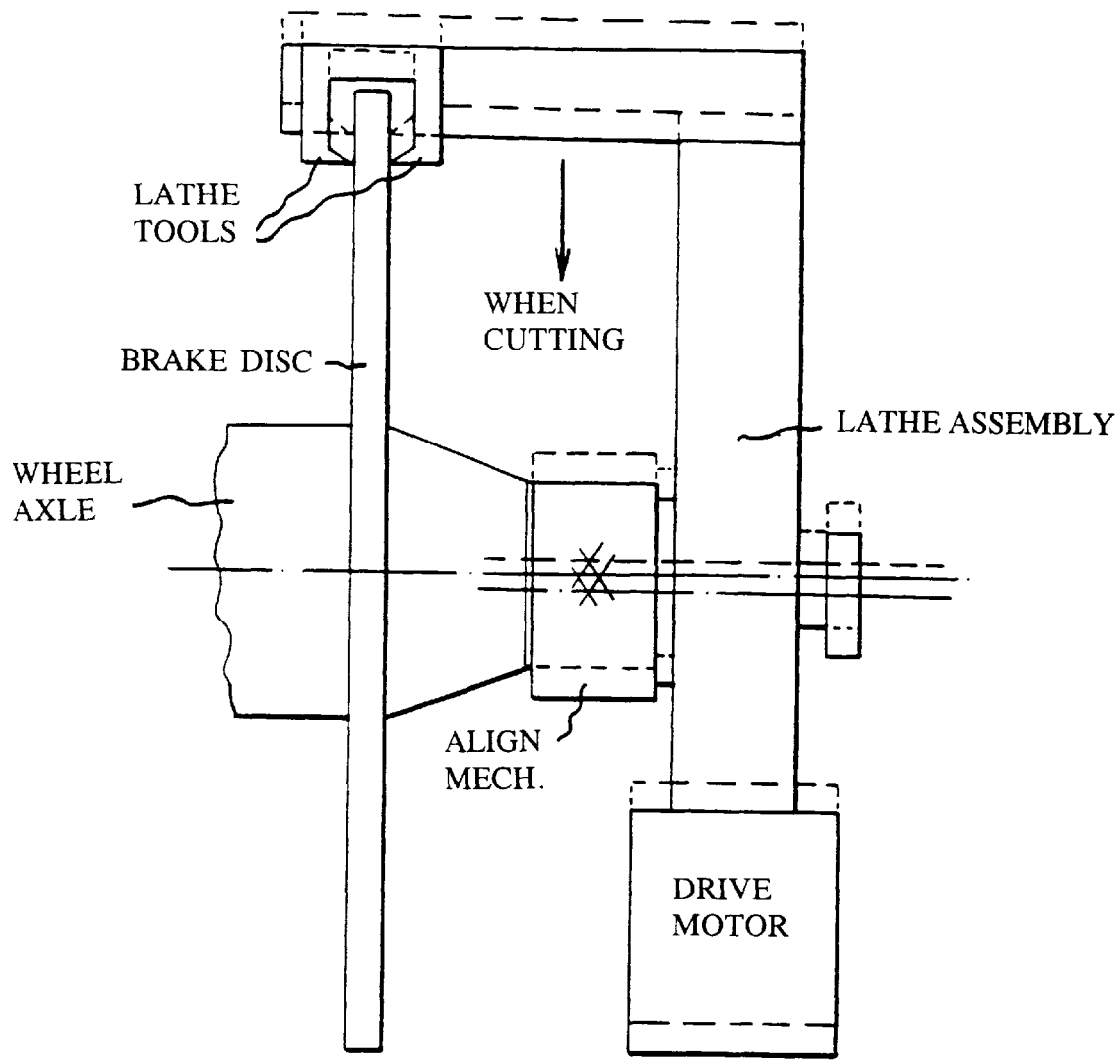
FIG. 18 is a schematic view of the linear runout phenomenon occurring during a cutting operation of the on-car disc brake lathe mounted on the hub of a vehicle.

Referring to FIGS. 17 and 18, a brake lathe assembly is coupled to a wheel axle through an automatic alignment mechanism of the type shown and described above. The lathe tools are shown positioned at the end of the brake assembly mechanism arm and arranged to move from the center of the brake disc toward the outside while the drive motor causes the wheel and brake disc to rotate as described above. The solid lines show the mechanism position when the wheel axis and the lathe axis are in alignment. The lathe tools cut the disc surfaces smoothly under these conditions.

However, when runout is present, as shown in FIG. 17, the lathe will rotate back and forth when in use. The dotted lines show the wobbling of the lathe mechanism when the wheel axis and the lathe axis are misaligned (in the drawing the runout is greatly exaggerated). Wobbling of the lathe mechanism and tools will cut the brake disc lateral runout into the rotor, which is unacceptable. At the "X" point, the mechanism changes its position not only linearly but also in a rotational sense perpendicular to the drive axis. That is, the angle of the mechanism changes cyclically as the wheel rotates.

The sensing devices of the runout sensing and control mechanism are placed at this X point to optimize measurement sensitivity. The sensing devices may be positioned such that the internal rotor axis of a device including such an axis is perpendicular to the lathe drive axis.

Referring to FIG. 18, another misalignment mode can occur when the wheel axis and the lathe axis are in misalignment. This is referred to as off-center misalignment. With off-center misalignment, the motion of the lathe mechanism includes only linear components so that no angular runout occurs and no rotational motion perpendicular to the drive axis occurs. This runout motion does not detract significantly from the smooth cutting of the brake disc surface and can be allowed. For this reason, the sensing device only needs to sense the rotational components impressed upon its housing, and may reject all linear motion.

A number of different sensing configurations can be used as a part of the runout sensing and control mechanism. For example, a rotary accelerometer may be employed as the runout detector, in which case two operating modes are employed. In a first mode, the natural frequency of resonant motion of the rotor transducer is configured (as explained below) to be about 1.5 times the frequency of lathe rotation. This configuration permits the accelerometer to rapidly follow changes in runout and, therefore, provides rapid alignment, due to damping inherent in the frequency differential. However, the runout sensitivity of the system is less than half that of the second mode.

In the second mode, the natural frequency of resonant motion of the rotor transducer is configured to be below the frequency of lathe rotation. This provides increased sensitivity to runout and helps to suppress harmonics in the runout motion which can cause alignment uncertainty. However, this mode is slower in following changes in runout, which may slow alignment as compared to the first mode. In any event, the natural frequency of resonant motion should never be placed at the frequency of lathe rotation because operating in resonance with the lathe results in an unnatural buildup of rotor-transducer motion which doesn't allow the accelerometer output to immediately follow the runout magnitude and seriously slows the alignment process.

Independent of the operation mode, several considerations are relevant in implementing the accelerometer. First, the accelerometer rotor should be completely balanced to insure measurement of rotational accelerations while rejecting linear accelerations. Second, the rotation of the rotor should be physically limited such that rotation only occurs within the sensitive area of the transducer. Finally, the natural frequency of resonant motion of the rotor-transducer should be configured to operate in either of the modes discussed above. In this regard, the natural frequency depends on several variables including the mass of the rotor, the diameter of the rotor, and characteristics of a spring element.

An accelerometer embodiment using a piezo-electric element as a sensor is well suited to operate under conditions in which the natural frequency of resonant motion is about 1.5 times the frequency of lathe rotation. Some force is required to bend the element, which tends to cause a high spring rate. Other transducer approaches, which generally employ non-contact devices, permit the spring rate to be controlled by spring selection. As such, these approaches are well suited to either mode one or mode two operation.

Figure 19B:
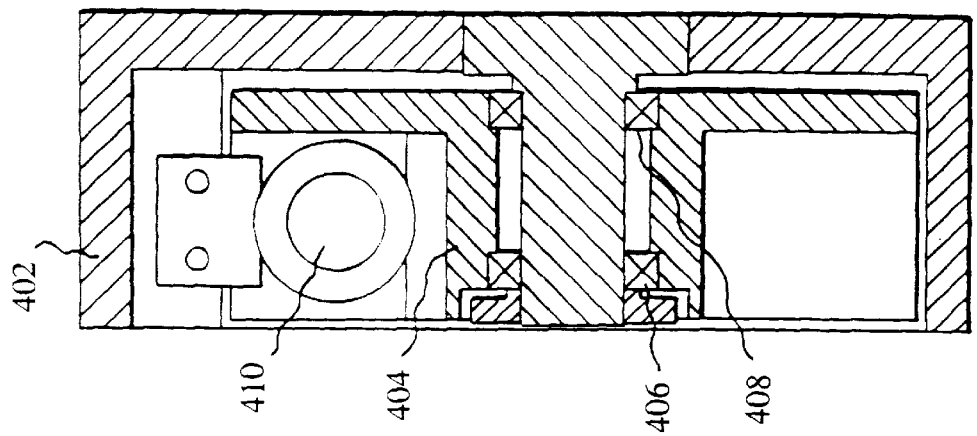
FIGS. 19A and 19B are front and cross-sectional views, respectively, of a rotary piezo-electric accelerometer.
Figure 19A:
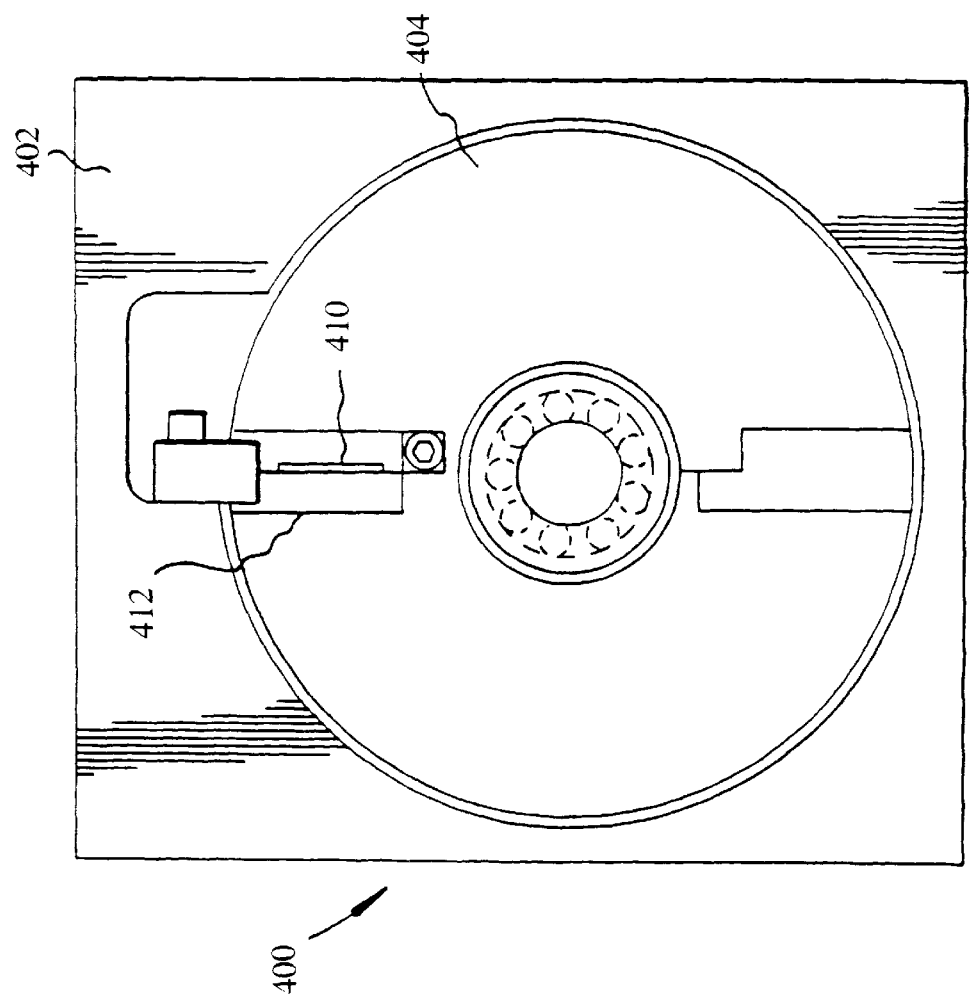

FIGS. 19A and 19B show a rotary accelerometer sensor 400. Sensor 400 includes a housing 402 that encloses a rotor 404 mounted for rotation on bearings 406 and 408. The rotor 404 is carefully balanced so that all accelerations except rotational acceleration cause no rotation of the rotor 404. Rotation of the rotor 404 is sensed by a piezo electric element 410 mounted between the housing 402 and the rotor 404. Element 410 is bent by any rotation of the rotor 404 to produce a voltage proportional to the magnitude of bending. The piezo electric element 410 is mounted in a slot 412 in the rotor 404 to limit rotation of the rotor 404 and thereby protect the piezo electric element 410.

The piezo electric element 410 and the rotor 404 operate as a spring and mass system having a natural frequency of resonant motion. In this system, the rotor 404 constitutes the mass and the piezo electric element 410 constitutes the spring. The system operates in mode one, in that the rotor mass and diameter, and the piezo spring constant, are adjusted to obtain a resonant frequency on the order of 1.5 times the frequency of lathe rotation.

The rotor 404 also should be suitably damped to minimize the settling time. This can be achieved by filling the housing 402 with a viscous fluid and sealing the housing with a cover. Alternatively, damping can be provided by using a clinging viscous material in the bearings 406 and 408. Other damping techniques may also be employed.

The piezo electric element 410 produces a voltage having a magnitude proportional to the magnitude of the angular runout. This control signal is supplied to a control system.

Figure 20:
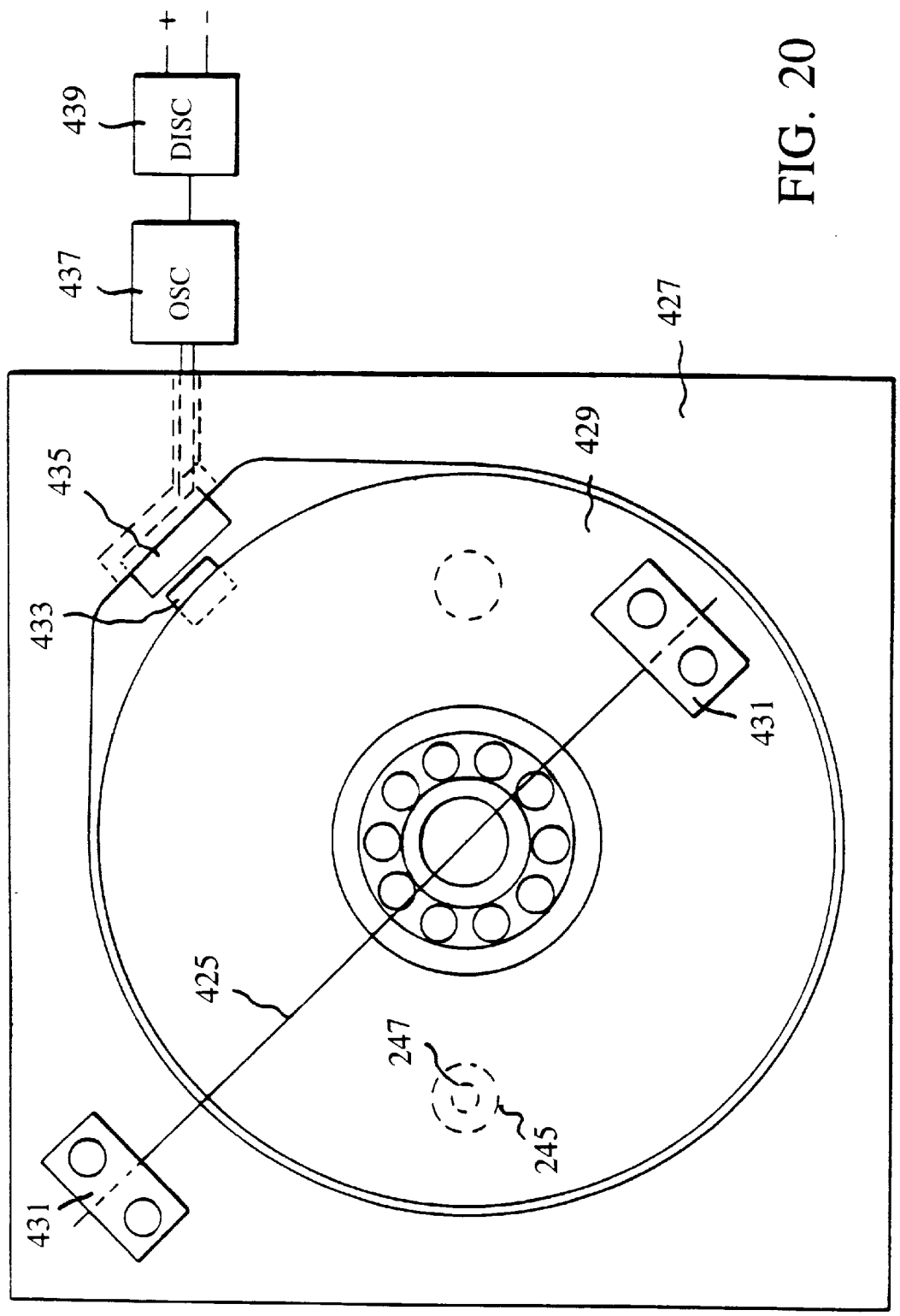
FIG. 20 is a front view of a rotary tuned coil oscillator accelerometer.

The sensing device may employ alternative transducing elements to provide the control signal. For example, as shown in FIG. 20, the sensing device may employ an accelerometer with a tuned coil oscillator. The spring component of this system includes a wire (preferably music or piano wire) 425 that is attached to a body 427 and rotor 429 as shown. The wire may be attached by any suitable means, such as, for example, brackets 431. As previously noted, the natural frequency of resonant motion of the rotor-transducer depends on the mass and diameter of the rotor and the spring characteristics of the wire. When using a music wire 425 to control frequency as shown, the diameter of the wire and the tension in the wire 244 are manipulated to vary the frequency. For example, to achieve a natural frequency or resonant motion of the rotor-transducer that is below the frequency of lathe rotation, a diameter in the range of approximately 9–10 thousandths of an inch is used and the wire tension is configured to be relatively loose. On the other hand, to achieve a natural frequency of resonant motion of the rotor-transducer that is about 1.5 times the frequency of lathe rotation, a diameter on the order of approximately 16 thousandths of an inch is used and the wire tension is configured to be relatively tight.

A ferrite or the like disc 433 is placed in the periphery of the rotor 429 adjacent to a housing-mounted coil 435 which serves as the inductor of an oscillator circuit 437. When the rotor 429 turns, the ferrite disc 433 moves in relation to the coil 435, causing a change in the inductance of the coil and a corresponding change in the frequency of oscillation. A discriminator 439 converts the change in frequency of oscillation to a varying DC voltage. This varying voltage reflects the rotation of the accelerometer housing 427. The signal is then forwarded to the control system.

As previously noted, it is important to configure the rotor such that it is balanced. To limit the rotation of the rotor such that rotation only occurs within the sensitive area of the transducer, a counterbore 441 is provided to cooperate with a pin 443 to limit rotor rotation as appropriate. Other limiting means may also be used.

Figure 21:
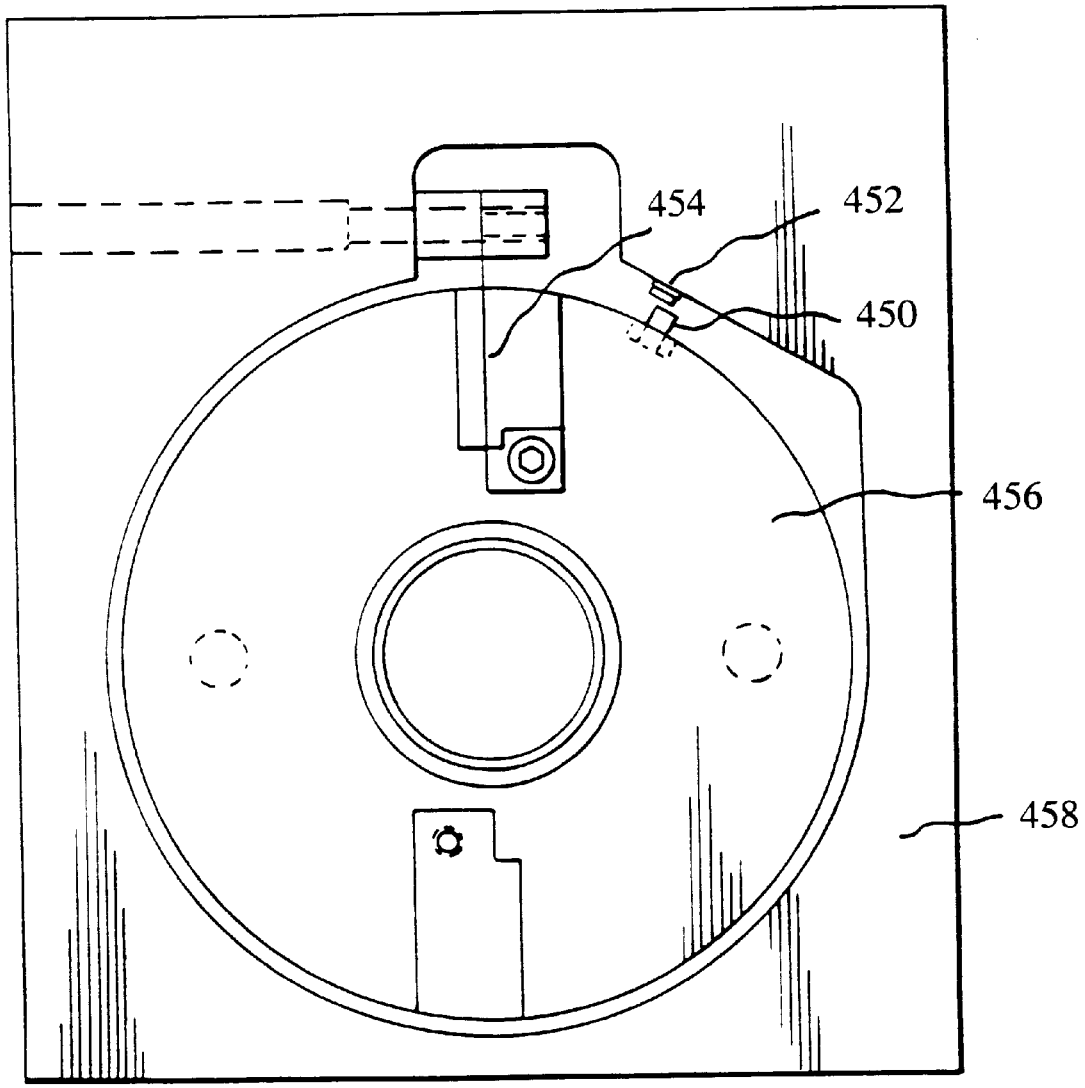
FIG. 21 is a front view of a rotary magnetic hall effect transducer.

Referring to FIG. 21, an accelerometer with a magnet 450 and a hall effect transducer 452 also may be used. In this configuration, a leaf spring 454 has a spring rate which, in combination with the inertia of the rotor 456, provides a resonant frequency about 1.5 times the rotational rate of the brake lathe shaft (i.e. operation in mode one). Alternatively, the accelerometer could be configured to operate in mode one or two using a music wire as described above.

The magnet 450 is placed in the periphery of the rotor 456. The hall effect transducer 452 has a linear characteristic and is placed in the housing 458 adjacent to the magnet 450 such that rotary motion of the rotor is reflected in the output voltage of the hall effect transducer 452. The magnitude of the AC voltage at the output of the hall effect transducer 452 is a reflection of the rotary motion of the accelerometer housing 458 that is attached to the lathe, preferably at the position identified with reference to FIGS. 17 and 18. The resulting signal is forwarded to a control system.

In yet another implementation, as shown in FIGS. 22 and 22A, the sensing element may includes an accelerometer with an infrared generator. A leaf spring 475 has a spring constant which, in combination with the inertia of a rotor 477, provides a resonant frequency about 1.5 times the rotational rate of the brake lathe shaft. Again, this accelerometer could alternatively be configured to operate in mode one or two using a music wire as described above. An infrared generator diode 479 is placed facing an infrared detector diode 481 on the housing 483 near the periphery of the rotor 477.

A shutter 485 is attached to the rotor 477 and projects between the IR generator 479 and IR detector 481 such that rotary motion of the rotor 477 varies the amount of radiant energy transferred, causing the voltage produced by the IR detector 481 to reflect the magnitude of rotation of the housing 483 (i.e., the runout of the disc coupling). The signal then is forwarded to the control system.

Referring to FIGS. 23 and 23A, yet another implementation employs an infrared sensor and detector as described above. The rotor 500 has a magnet 502, such as a Neo Iron Boron type magnet available from Jobmaster as Part No. NE0270200N, embedded in its upper face. A linearly-adjustable tapped block 504 is mounted on the underside of the cover 506 of the accelerometer housing 508. A permeable screw 510 threads into the block 504 and is positioned so that, with the cover mounted on the housing, the end of the screw sits just above the magnet 502.

The block 504 may be adjusted using screws 512 in slots 514 to position the rotor 500 by magnetic attraction. This permits positioning of the rotor so that the shutter 516 interrupts infrared energy in an infrared sensor assembly 518 using a generator and detector as described above with reference FIGS. 22 and 22A to provide a desired steady state DC output voltage.

Turning the permeable screw 510 to move it toward the magnet 502 provides an increase in magnetic attraction and consequent increases in the spring constant and the natural frequency at which the rotor rings. Moving the screw away from the magnet 502 has the opposite effect.

With good bearings, the rotor has low loss such that rotary mode ringing occurs for several seconds after the rotor is actuated. This is not desirable since it impedes the accelerometers ability to follow a changing actuating force.

Ringing is reduced by damping provided by a ferro fluid 520, such as is available from Ferrofluidics Corporation. A ferro fluid is an oil-based fluid with a suspension of microscopic permeable particles that cause the fluid to cling to a magnet.

The permeable screw, the ferro fluid, and the magnet are arranged in a plastic cup 522 in the periphery of the rotor. A drop of ferro fluid 520 on the magnet 502 clings to the interface between the magnet and the permeable screw. The fluid is of sufficient viscosity to damp the rotor to reduce ringing time by a factor of three. To prevent unwanted interaction between the fluid and the surface of the magnet, the magnet may be covered by a piece of Teflon tape to seal the surface of the magnet.

The viscosity of the ferro fluid is temperature sensitive. This means that system performance may vary with varying temperature.

Referring to FIGS. 24 and 24A, temperature sensitivity may be reduced by heating the fluid. A thermally conductive block 525, which may be metal, is used for electrical heating. Block 525 is larger than the unheated block 504 to allow for a slot into which a positive temperature coefficient (PTC) resistance element 527 may be potted using thermally conductive epoxy. The PTC element 527 is supplied by wires 529 from a fixed DC voltage source.

To thermally isolate the block 525 from the cover 506, an insulating pad 531 is placed between the two. The block 525 is held in place by nylon screws 533 to further thermally isolate the block.

In yet another variation, the accelerometer is replaced by an angular rate sensor that employs a pair of micromachined tuning forks. Rotation of the sensor induces a Coriolis effect that causes a difference in the output of the two forks. The difference is reflected in the output of the sensor, and provides an indication of the rate of rotation. Such a sensor is available from BEI Systron Donner Inertial Division Sensors and Systems Company of Concord, Calif. as part number AQRS-00064-109N.

Figure 25:
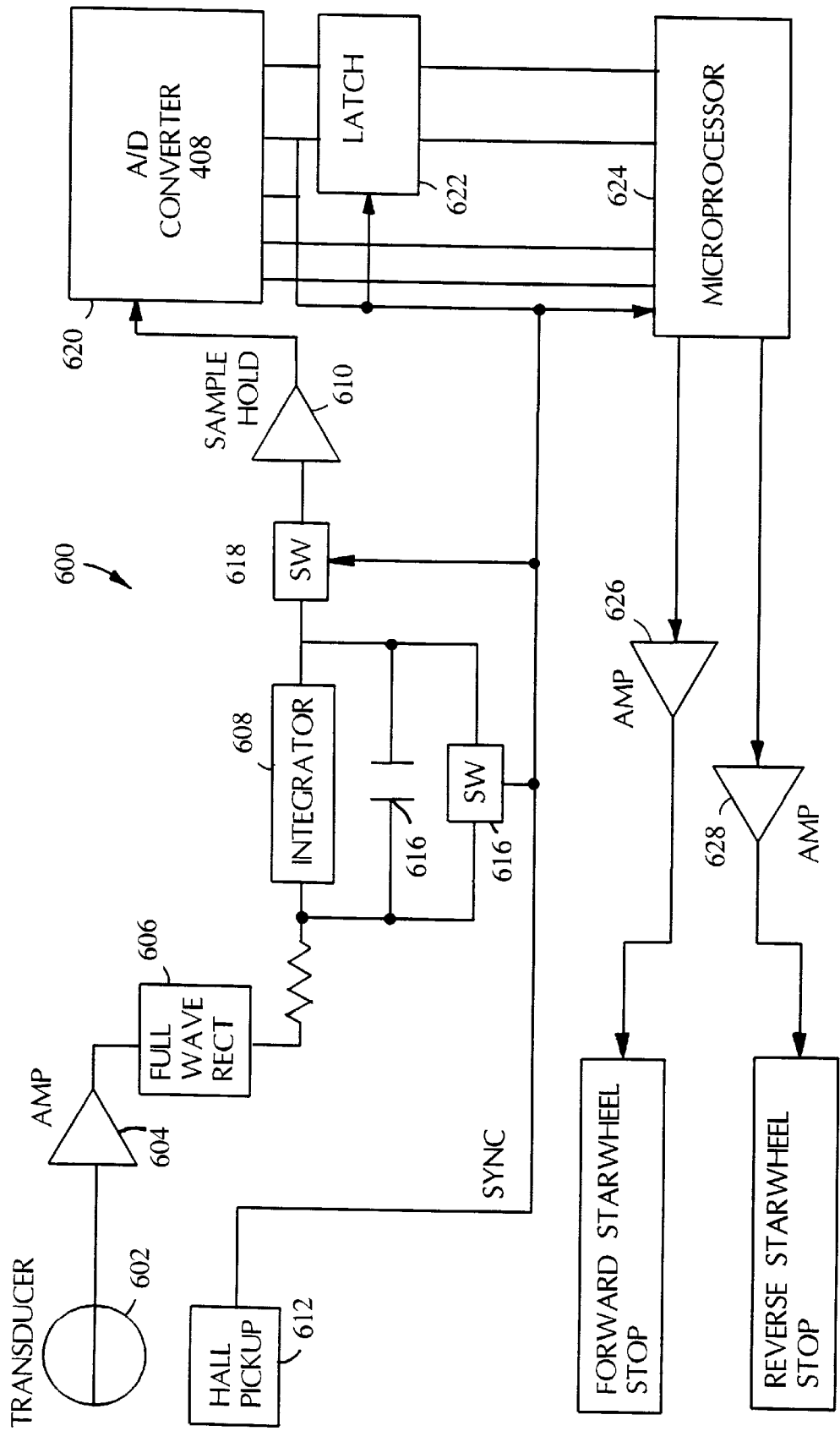
FIG. 25 is a circuit diagram of a control system of a runout measurement and control system.

Referring to FIG. 25, the runout sensing and control mechanism further includes a control circuit 600. A transducer 602 may be implemented using an accelerometer or angular rate sensor as described above to evaluate the rotational acceleration of the lathe. Because lateral runout manifests itself in varying rotational motion imparted to the lathe, any sensor arrangement capable of producing an accurate qualitative measure of rotational acceleration may be used. The following discussion assumes that the transducer produces an alternating current signal having a magnitude that varies with the degree of rotational motion.

The output of transducer 602 is fed to an amplifier 604 and then to a rectifier 606. Because runout produces a cyclical motion in the lathe, the signal produced by transducer 602 is sinusoidal in nature. However, other wave forms could resonate at lower runout. After amplification by amplifier 604 and rectification by full wave rectifier 606, the peak runout signal is fed to an integrator 608 that is reset during each lathe rotation cycle. The signal is then sent to a sample and hold circuit 610.

A hall pickup timer 612 produces a synchronization signal. This signal causes a switch 614 to transition to discharge a capacitor 616 to reset the integrator 608. The synchronization signal also causes a switch 618 to transition to store the output value of the integrator in the sample and hold circuit 610 prior to discharging the capacitor.

The output of the sample and hold circuit 610 is transmitted to an A/D converter 620 which samples the output and produces a digital representation of the voltage level. The output of the A/D converter 620 is provided to a latch 622 and a microprocessor 624. The microprocessor 624 also receives the output of latch 622. Latch 622 is a conventional sample and hold latch and is clocked just prior to the time A/D converter 620 presents a new sample. In this manner, both the current sample taken by A/D converter 620 and the last sample taken by A/D converter 620 are available to microprocessor 624. Amplifiers 626 and 628 are provided at the output of microprocessor 624 to drive the stop mechanism(s).

Taken in conjunction with the algorithm set forth in FIG. 16, microprocessor 624 is thus provided with a stream of samples of the runout of the rotor under consideration, together with a sample representing the last historical value of the runout. In this manner, the microprocessor implements the trial and error approach described above with respect to FIG. 16.

FIGS. 26–31 illustrate another implementation of the runout adjustment mechanism. This implementation is similar to the implementation of FIG. 12 in that the rotational positioning of the slant discs relative to each other and to the input and output adaptors is performed by actuating four starwheels, or stop discs, to drive gear trains that then drive the slant discs. In this implementation, however, the four starwheels are all aligned in the same plane. With this arrangement, only one stop mechanism is needed to actuate the starwheels, with the correct starwheel being selected through timed actuation of the stop mechanism.

The runout adjustment mechanism may be totally enclosed, so as to prevent contamination by metal chips produced as a result of the lathe operation. A separate cover is not required. The stop mechanism may be mounted adjacent to the runout adjusting mechanism and may be provided with its own cover to prevent contamination by lathe chips.

The single-plane implementation of FIGS. 26–31 uses a reduced number of components and, accordingly, is less expensive to manufacture than the implementation of FIG. 12. The single-plane implementation also is "stiffer" because it does not require the partially hollow input and output adaptors of the implementation of FIG. 12 since gearing may be positioned at the periphery of the mechanism.

Referring to FIGS. 26 and 27, an alignment mechanism 700 occupies the same position as the mechanism 144 of the implementation of FIG. 12. An input adaptor 702 is attached to and is rotationally driven by the output shaft 704 of a brake lathe. Input adaptor 702 includes four starwheels 706–712 which drive gear trains to position two slant discs, as described in more detail with reference to FIG. 28.

A stop mechanism assembly 714 is mounted on the bearing cap 716 of the brake lathe by means of a mounting yoke 718. The stop mechanism depicted in FIGS. 28 and 29 includes a solenoid 720 coupled by a link 722 to an actuator arm 724 attached to a starwheel stopper 726. A coil spring 728 serves to open the solenoid core and retract the stopper 726 when the solenoid 720 is not powered. A stop pad 730 serves to cushion the return of actuator arm 724 when the solenoid 720 is de-energized. In other implementations, the stop mechanism 714 may employ devices other than a solenoid.

When the stop mechanism 714 is activated, the actuator arm 724 forces the starwheel stopper 726 against the periphery of the alignment mechanism 700 and into the path of the four starwheels 706–712. A sync magnet 732 carried by the rotating alignment mechanism 700 passes by a hall detector 734 once each revolution. The hall detector 734 provides an output that serves as a timing signal for electronic control of the stop mechanism 714.

Figure 28:
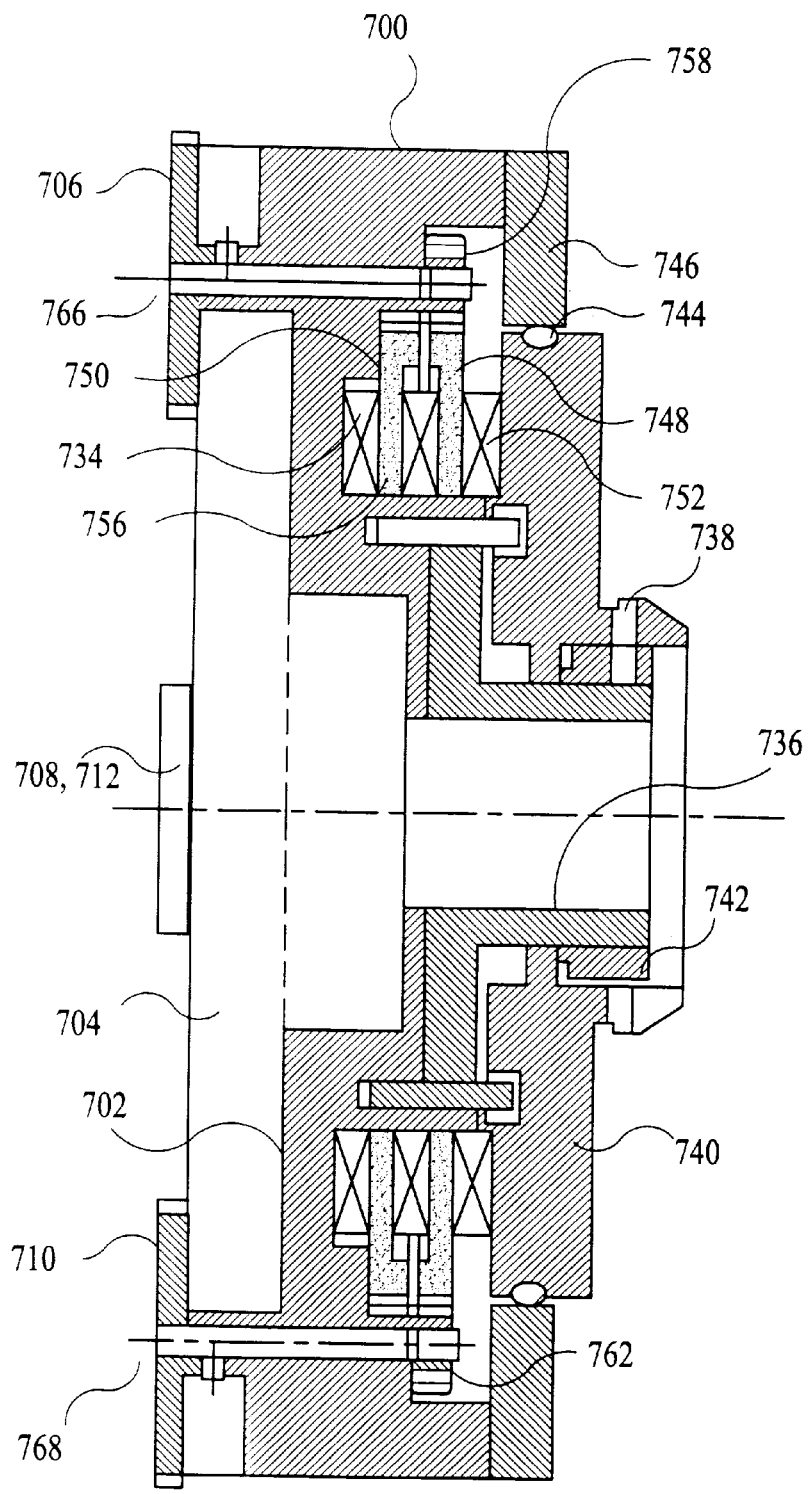

Referring to FIG. 28, the alignment mechanism 700 includes an output adaptor support 736 attached to the input adaptor 702. A pin 738 projects from a peripheral surface of the output adaptor support 736 and serves to rotationally couple an output adaptor 740 to the input adaptor 702 so that the output adaptor 740 rotates with the brake lathe shaft 704. A collar 742 serves to hold the output adaptor 740 on the output adaptor support 736 while allowing the output adaptor 740 to tip at up to a desired angular limit (for example ±1 degree) from perpendicular to the rotational axis.

The periphery of the output adaptor 740 is grooved to accept a rubber "O" ring 744. A seal ring 746 attached to the input adaptor 702 cooperates with the "O" ring 744 to seal the interior of the mechanism against contamination.

Slant discs 748 and 750 serve to vary the angle between the input adaptor 702 mounting surface and the output adaptor 740 mounting surface. Slant discs 748 and 750, which have gear teeth on their respective peripheries, are mounted between the input adaptor 702 and the output adaptor 740. Three sets of pin roller thrust bearings 752–756 separate the slant discs 748 and 750 from each other and from the input adaptor 702 and the output adaptor 740. Under normal axial pressure, the thrust bearings 752–756 allow the slant discs 748 and 750 to rotate freely in relation to each other and in relation to the input adaptor 702 and output adaptor 740.

The mounting surface of the input adaptor 702 and the mounting surface of the output adaptor 740 are caused to be parallel when the equally angled faces of the slant discs 748 and 750 are rotated to a position in which they complement each other. The mounting surfaces are offset from parallel when the equally angled faces of the slant discs 748 and 750 are rotated to a position in which they oppose each other.

Four starwheels 706–712 attached to gears 758–764 by shafts 766–772 facilitate rotational control of the slant discs 748 and 750 in relation to each other and in relation to the input adaptor 734 and the output adaptor 740.

Figure 29:
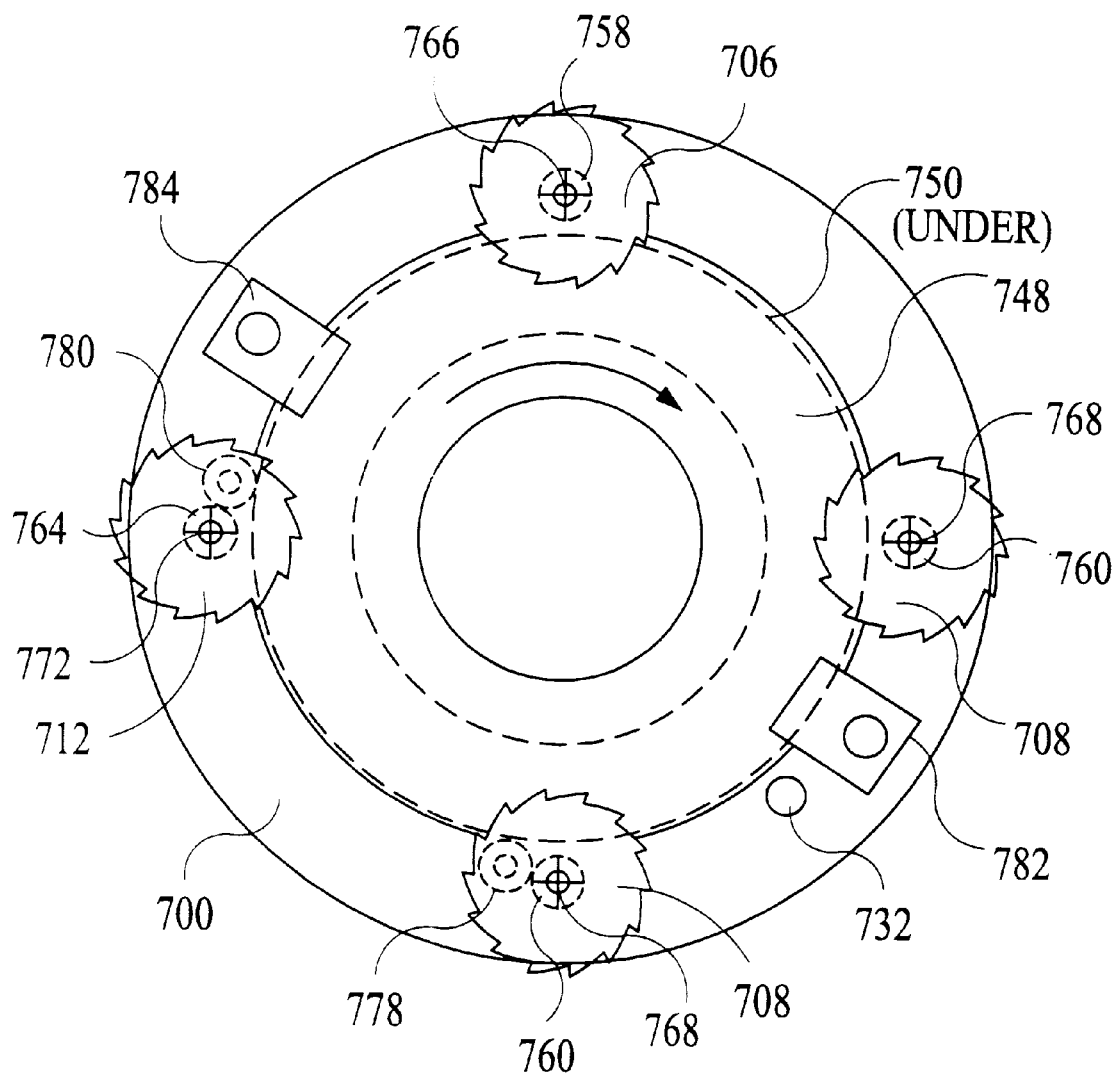

FIG. 29 shows the relative locations of the starwheels 706–712 and the sync magnet 732. Also shown are the brackets 774 and 776 that clasp the shaft alignment mechanism to the brake lathe output shaft 704. Shafts rotationally couple the starwheels 706–712 to corresponding gears 758–764. Gears 758 and 760 directly engage the teeth on the periphery of the slant discs 748 and 750, respectively. This arrangement causes slant discs 748 and 750 to rotate with the rotation of the respective starwheels 706 and 708. Gears 762 and 764 engage reverse gears 778 and 780, respectively, which engage the teeth on the periphery of slant discs 748 and 750, respectively. Reverse gears 778 and 780 serve to reverse the rotational direction of slant discs 748 and 750 when starwheels 710 and 712 are rotated.

Each starwheel serves a distinct function. Starwheel 706, which may be labelled the "A Disc Forward" starwheel, is rotationally coupled to gear 758 by shaft 768. Gear 758 engages the teeth on the periphery of slant disc 748. Thus, when one of the teeth of starwheel 706 is stopped or caught by the stopper 726, slant disc 748 (the "A Disc") rotates in a forward direction relative to the alignment mechanism 700.

Starwheel 708, which may be labelled the "B Disc Forward Starwheel" works in a similar fashion as starwheel 706 described above, except that when starwheel 708 is engaged, slant disc 750 (the "B Disc") rotates in a forward direction.

Starwheel 710 may be labelled the "A Disc Reverse Starwheel." Starwheel 710 is rotationally coupled to gear 762 by shaft 770. Gear 762 engages reverse gear 778, which engages the teeth along the periphery of slant disc 748. Thus, when one of the teeth of starwheel 710 is caught by the stopper 726, gear 778 reverses the rotational direction, and slant disc 748 (the "A Disc") rotates in a reverse direction relative to the alignment mechanism 700.

Starwheel 712, which may be labelled the "B Disc Reverse Starwheel" works in a similar fashion as starwheel 710 described above, except that when starwheel 712 is engaged, slant disc 750 (the "B Disc") rotates in a reverse direction.

Figure 30:
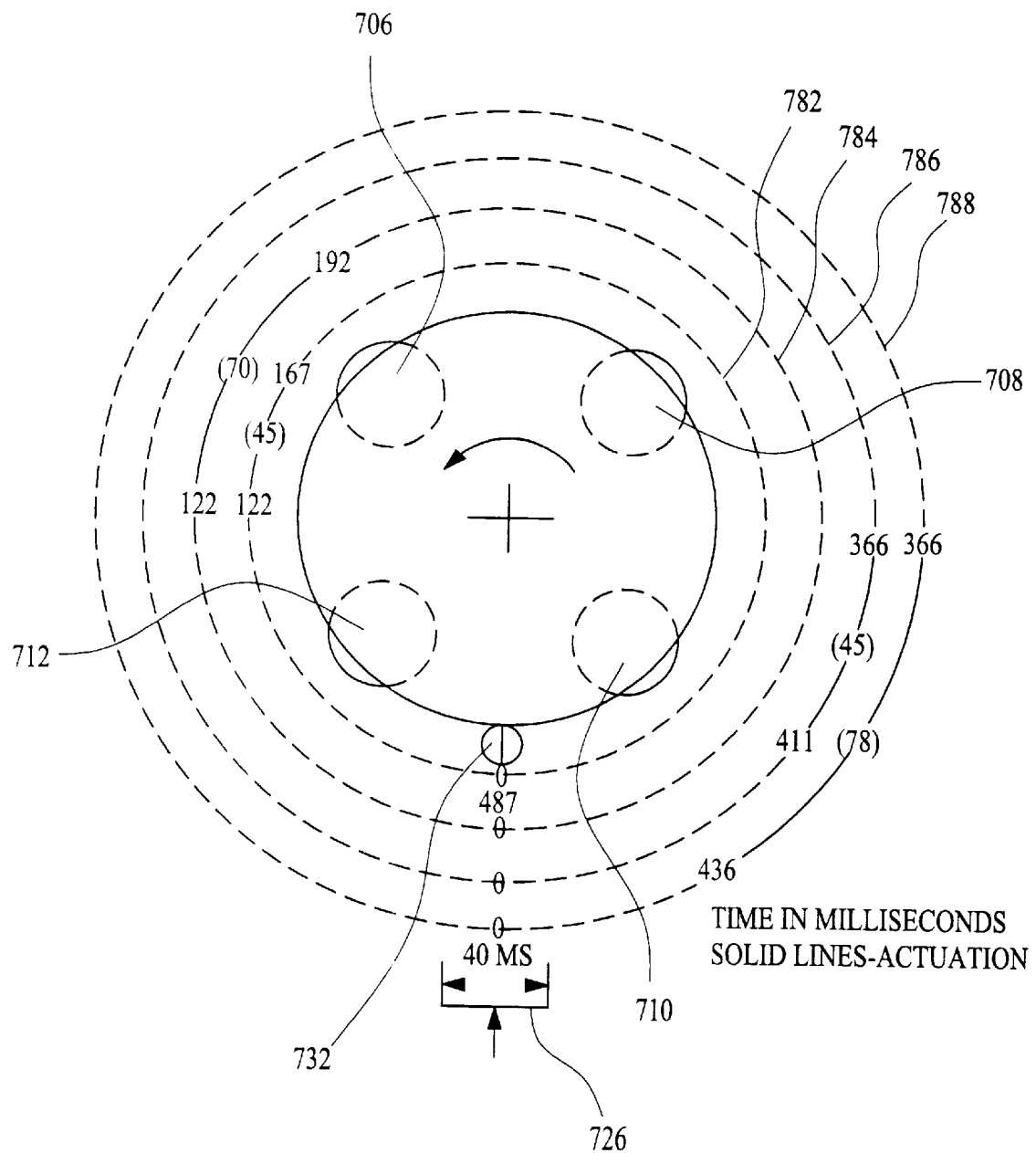
FIGS. 30 and 31 are timing diagrams associated with the mechanism of FIG. 26.

FIG. 30 illustrates actuation timing for adjustment of the compensation angle using the single-plane mechanism. Adjustment of the compensation angle may be achieved through incremental rotation of either of the slant discs 748 or 750 in either forward or reverse directions. With the single-plane implementation, control of the actuation is achieved exclusively through timing of the single stopper 726.

The concentric circles 782–788 of FIG. 30 are calibrated in time. Time zero is defined as the time, in a given revolution, at which the sync magnet passes the hall detector, as described with reference to FIGS. 26 and 27. The concentric circles in FIG. 30 show the elapsed time in milliseconds from time zero to the calibrated point, when the alignment mechanism 700 is rotating normally at 2.054 revolutions per second. The times indicated are approximate and may be varied to achieve a desired adjustment operation. The solid line of each of circles 782–788 indicates the stopper 726 actuation period. Each of circles 782–788 represents the actuation timing for a particular change in the compensation angle.

In the diagram of FIG. 30, the stopper 726 includes two prongs. The stopper prongs are separated such that, at the rotation rate of the alignment mechanism 700, forty milliseconds will elapse from the time a starwheel passes the first stopper prong to the time the same starwheel passes the second stopper prong. Thus, the stopper can be actuated in time to catch a first tooth of a selected one of the starwheels 706–712 with the first stopper prong, while leaving 40 milliseconds during which the stopper may be retracted so that the second stopper prong does not contact a second tooth of the selected starwheel. The stopper 726 may be configured with more stopper prongs as needed to facilitate the desired starwheel actuation.

The number of teeth of a selected starwheel caught during a revolution of the alignment mechanism 700 can be programmed. Preferably, when the alignment runout is large, the program calls speeds adjustment by calling for two teeth of the selected starwheel to be caught during each revolution. This may be referred to as dual-stop actuation. As the runout approaches zero, one tooth is caught per revolution to allow finer adjustment. This may be referred to as single-stop actuation.

Circle 782 represents a "Forward-Angle, Single-Stop" actuation. The actuation period is indicated by the solid portion of circle 782. Thus, to adjust the compensation angle in a forward direction, the stopper 728 may be actuated for 45 milliseconds beginning 122 milliseconds after time zero. During this period, one tooth of starwheel 706 (the "A Disc Forward Starwheel) is caught by the stopper 726. As a result, slant disc 748 (the "A Disc") rotates forward by a corresponding amount relative to the alignment mechanism 700, as described above.

Circle 784 represents a "Forward-Angle, Dual-Stop" actuation. During this actuation, two teeth of starwheel 706 are caught, and slant disc 748 rotates forward by a corresponding amount relative to the alignment mechanism. The amount of slant disc 748 rotation in this actuation is larger than that of the "Forward Angle, Single Stop" actuation because two teeth of starwheel 706 are caught instead of one.

Circles 786 and 788 represent the "Reverse-Angle, Single-Stop" and "Reverse-Angle, Dual-Stop" actuation periods, respectively. The reverse actuations are similar to the forward-angle actuations except that starwheel 710 (the "Reverse A Disc Starwheel") is engaged so that slant disc 748 rotates in a reverse direction relative to the alignment mechanism 700.

Figure 31:
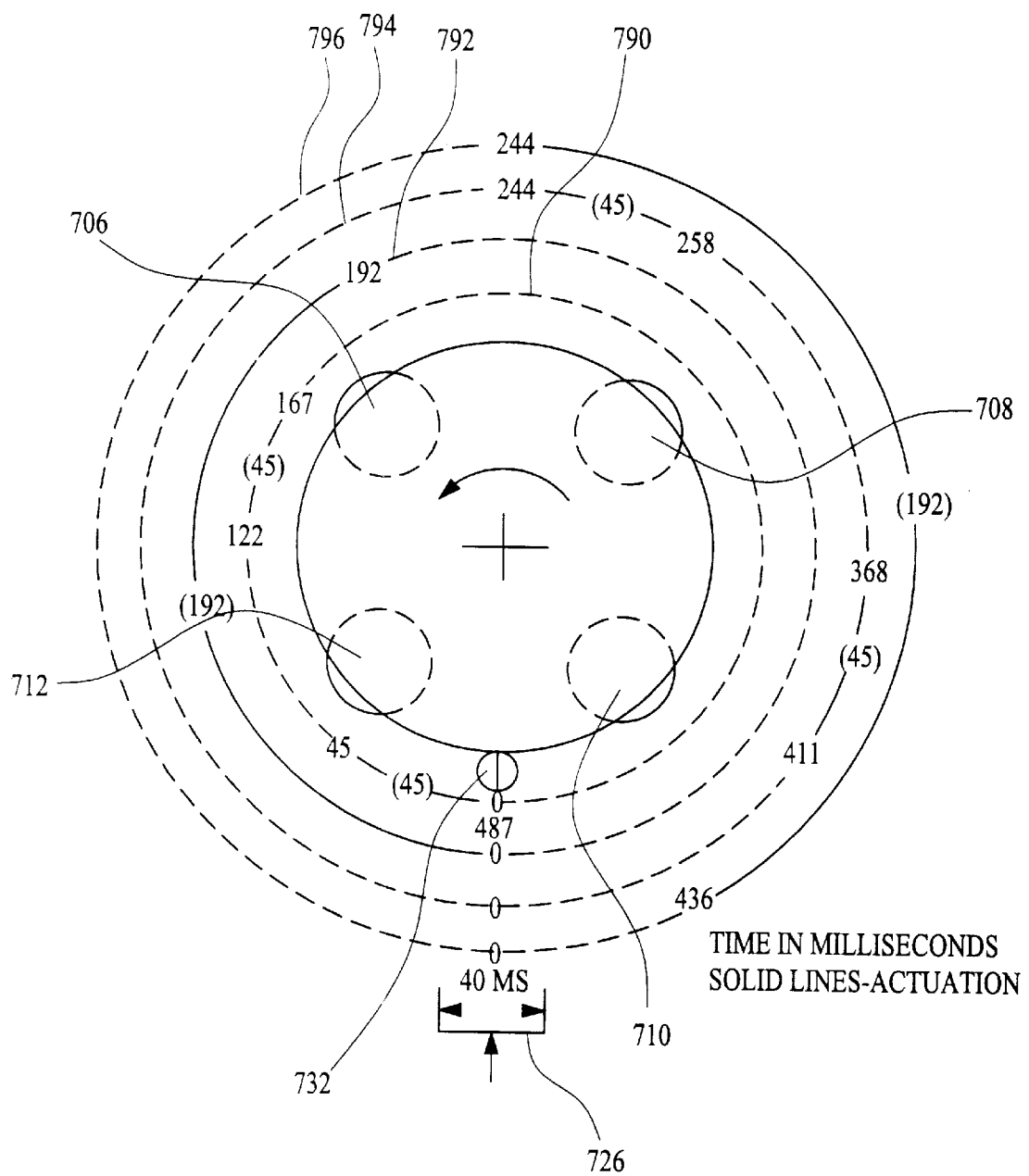

FIG. 31 shows the actuation timing for adjustment of the compensation vector using the single-plane mechanism. As in FIG. 30, the concentric circles 790–796 in FIG. 31 are calibrated and show the elapsed time in milliseconds from time zero to the calibrated point with the alignment mechanism 700 rotating normally at 2.054 revolutions per second. Each of circles 790–796 represents the actuation timing for a particular change in the compensation vector. The times indicated are approximate and may be varied to achieve a desired adjustment operation.

Adjustment of the compensation vector may be achieved through incremental rotation of both slant discs 748 and 750 by equal amounts in the same direction (either forward or reverse). The compensation vector changes as the slant discs 748 and 750 rotate relative to the alignment mechanism 700. However, the compensation angle remains the same. Because both slant discs 748 and 750 are rotated by the same amount in the same direction. Depending on the amount of adjustment needed, the actuation may be single-stop or dual-stop.

Circle 790 represents a "Forward-Vector, Single-Stop" actuation. This process involves actuating the stopper 726 for a period of approximately 45 milliseconds beginning at time zero, and again for 45 milliseconds beginning 122 milliseconds after time zero, as indicated by the solid portion of circle 790. During this process, the stopper 726 first catches a single tooth of starwheel 712, which causes slant disc 748 to rotate forward, and then catches a single tooth of starwheel 706, which causes slant disc 750 to rotate forward by the same amount.

Circle 792 represents a "Forward-Vector, Dual-Stop" actuation. In this process, the stopper 726 is actuated for a period of 192 milliseconds beginning at time zero. During this period, two teeth on each of starwheels 712 and 706 are caught and the slant discs 748 and 750 are caused to rotate forward by a corresponding amount. Because two teeth are caught on each of starwheels 712 and 706, the slant discs 748 and 750 rotate by a larger amount and the compensation vector is adjusted by a larger degree than in the "Forward-Vector, Single-Stop" actuation.

Circles 794 and 796 represent "Reverse-Vector, Single-Stop" and "Reverse-Vector, Dual-Stop" actuations, respectively. These actuation processes are similar to the forward-vector actuations, but differ in that starwheels 708 and 710 are engaged instead of starwheels 706 and 712, so that slant discs 748 and 750 are caused to rotate in a reverse direction relative to the alignment mechanism 700.

Without attempting to set forth all of the desirable features of the instant on-car disc brake lathe with automatic alignment system, at least some of the major advantages include providing an on-car disc brake lathe having an automated alignment assembly 50 that includes a pair of adjustment disc assemblies that are positioned between an input adaptor 66, 122, 146 and an output adaptor 78, 134, 168. Each of the adjustment disc assemblies includes an adjustment disc 90, 92, 140, 152, 160 and associated stop disc. An electromagnetic catch 98, 100 or the like is operably associated with each of the stop discs 94, 96 and operates in response to a control signal issued from a control system. When the rotation of one of the stop discs is stopped, rotational movement of the lathe drive shaft is transferred, through appropriate gearing, to a respective adjustment disc to change the relative position of the lathe drive axis and the vehicle hub axis.

The control algorithm and alignment process may include a series of trial and error adjustment inquiries to compensate for runout. The Hall signal serves as a timing signal. As the lathe rotates, the runout level is evaluated. If the runout level is within the "Spec" limit, normally 0.001 inches, the alignment goes to the "Ready to Cut" state, the corresponding light is illuminated, and the program ends. If the runout is above the "Spec" limit, an actuation of the output forward starwheel is ordered. The runout is evaluated and if lower than the previous runout, added actuations of the same starwheel are ordered until an actuation causes the runout to increase. At this point, if the runout is still above the "Spec" limit, an actuation of the output reverse starwheel is ordered. If the resulting runout is lower, further such actuations are ordered until an actuation causes the runout to increase. The previous two actions adjusts the "compensation angle." At this point, if the runout is still above the "Spec" limit, a tandem actuation of both the output and the input forward starwheels is ordered. This action adjusts the "compensation vector." The runout is evaluated and if lower than the previous runout, further tandem actuations of the output and input forward starwheels are ordered until an actuation causes the runout to increase.

At this point, if the runout is still above the "Spec", a tandem actuation of the output and input reverse starwheels is ordered. The runout is evaluated and if lower than the previous runout, further such actuations are ordered. If an actuation causes a runout increase, and if the runout is still above the "Spec" limit, the starwheel actuations revert to the output starwheels only mode again as described previously. This trial and error actuation sequence continues as described above until the runout is reduced to the "Spec" limit, where the "Ready to Cut" light is illuminated and the program ends.

A count is kept of the number of tries to reach the "Spec" runout level. When a preset number of tries is exceeded, the acceptance level is raised to about 0.003 inches. If the runout is within this level, the "Ready to Cut" light is illuminated and the program ends. If this new higher runout level is not reached within a preset number of tries, an "Out of Spec" light is illuminated and the program ends. The operator is directed to check the lathe coupling to the brake disc hub, to check for bad wheel bearings, to correct the problem, and to try the alignment cycle again.

Figure 32:
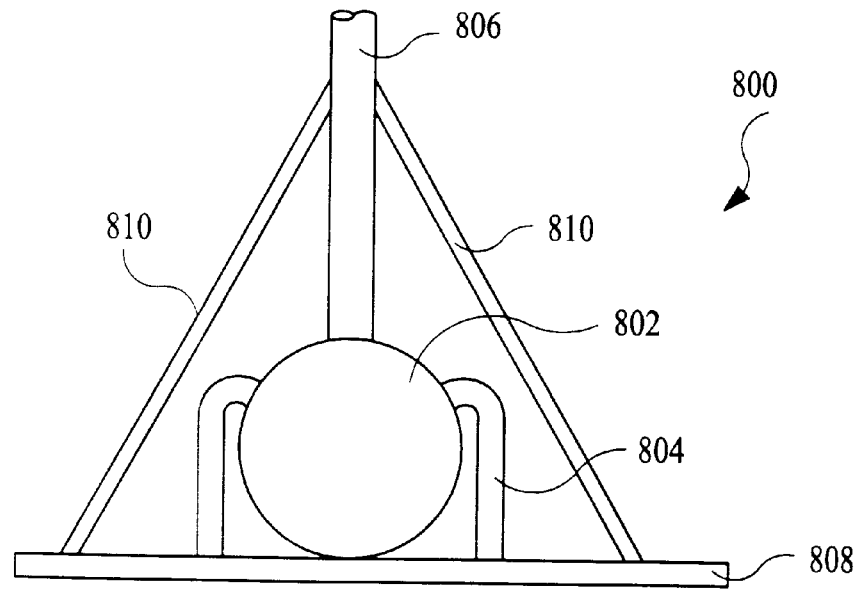
FIGS. 32 and 33 are side and end views of a ball-and-socket joint adaptor.
Figure 33:
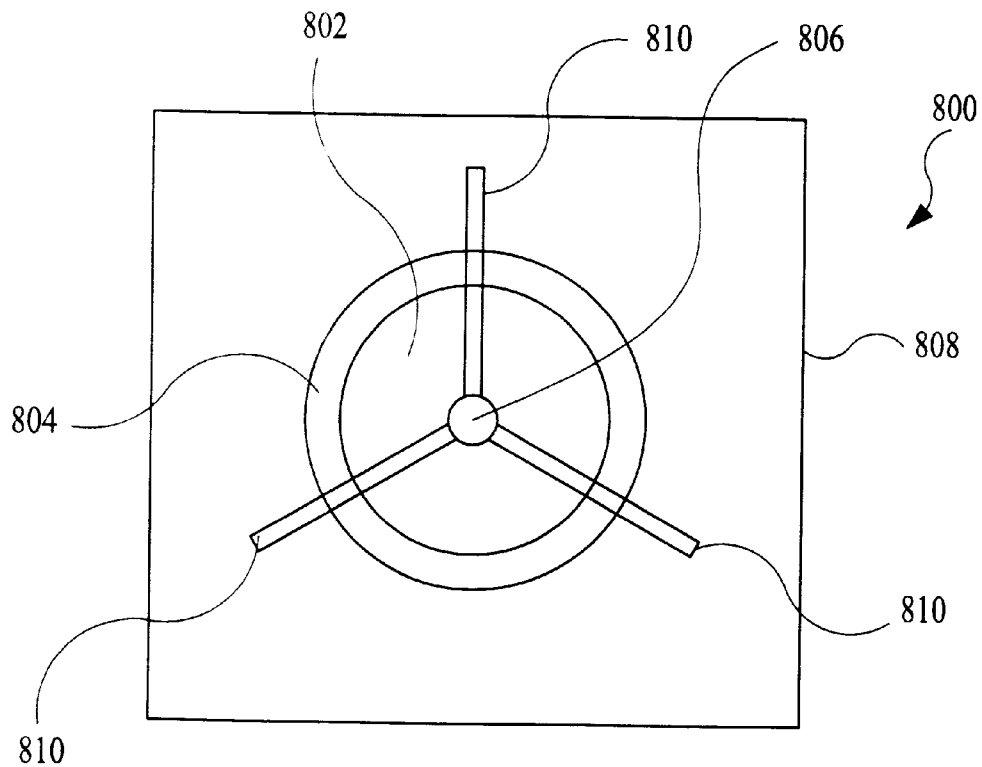

Other embodiments are within the scope of the following claims. For example, referring to FIGS. 32 and 33, instead of using slant discs to adjust the orientation of the input and output adaptors, a joint 800 including a ball 802 and a socket 804 may be used. An extension 806 attached to the ball 802 is connected to a platform 808 attached to the socket 804 by three arms 810. The length of the arms can be adjusted to control the orientation of the extension relative to the platform.

Figure 34:
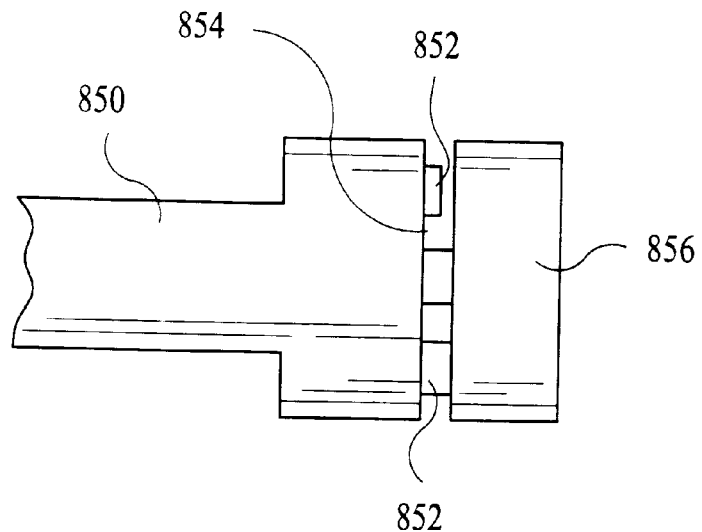
FIGS. 34 and 35 are side and end views of an adaptor using servo-controlled extenders.
Figure 35:
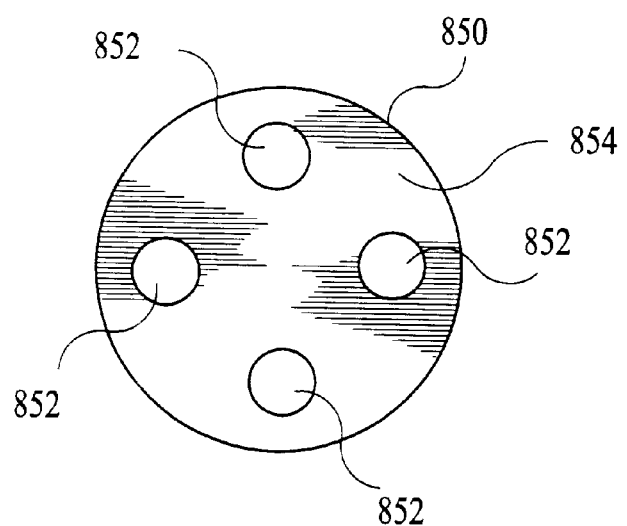

In addition, referring to FIGS. 34 and 35, an adaptor 850 having four servo-controlled extenders 852 may be employed. A distance to which each extender 852 extends from a surface 854 of the adaptor 850 may be controlled to control the orientation of the adaptor 850 to a corresponding adaptor 856.

What is claimed is:

1. An on-vehicle brake lathe system for resurfacing a brake disc of a vehicle brake assembly, the on-vehicle brake lathe system comprising a lathe body with a driving motor, a cutting head operably attached to the lathe body, and a drive shaft, the on-vehicle brake lathe system being further defined by an alignment system including:
   a component operable to produce a signal indicative of movement of the lathe body;
   an electronic controller operable to receive the signal from the component and to produce a control signal using the signal from the component;
   an input adaptor configured to rotate with the drive shaft;
   an output adaptor configured to rotate with the drive shaft;
   at least one adjustment disc positioned between the input adaptor and the output adaptor, wherein an axial alignment of the input adaptor relative to the output adaptor is varied according to a rotational orientation of the adjustment disc; and
   an adjustment mechanism connected to receive the control signal from the electronic controller and configured to change the rotational orientation of the adjustment disc in response to the control signal from the electronic controller.

2. An on-vehicle brake lathe system for resurfacing a brake disc of a vehicle brake assembly, the on-vehicle brake lathe system comprising a lathe body with a driving motor, a cutting head operably attached to the lathe body, and a drive shaft, the on-vehicle brake lathe system being further defined by an alignment system including:
   an electronic controller operable to produce a control signal;
   an input adaptor configured to rotate with the drive shaft;
   an output adaptor configured to rotate with the drive shaft;
   at least one adjustment disc positioned between the input adaptor and the output adaptor, wherein an axial alignment of the input adaptor relative to the output adaptor is varied according to a rotational orientation of the adjustment disc; and
   an adjustment mechanism connected to receive the control signal from the electronic controller and configured to change the rotational orientation of the adjustment disc in response to the control signal from the electronic controller;
   wherein the adjustment mechanism comprises a stop disc operable in a first state to follow the rotation of the drive shaft and operable in a second state to rotate relative to the rotation of the drive shaft to change the rotational orientation of the adjustment disc.

3. The on-vehicle brake lathe system of claim 2 wherein the adjustment mechanism further comprises a stop mechanism associated with the stop disc and operable to move between a first position in which the stop disc operates in the first state and a second position in which the stop disc is caused to operate in the second state.

4. The on-vehicle brake lathe system of claim 3 wherein:
   the at least one stop disc comprises a pair of stop discs,
   the first stop disc operates in the first state when the stop mechanism is in the first position, operates in the second state when the stop mechanism is in the second position at a first time, and operates in the first state when the stop mechanism is in the second position at a second time different from the first time, and
   the second stop disc operates in the first state when the stop mechanism is in the first position and when the stop mechanism is in the second position at the first time, and operates in the second state when the stop mechanism is in the second position at the second time.

5. The on-vehicle disc brake lathe system of claim 1 further comprising a second adjustment disc positioned between the input adaptor and the output adaptor, wherein the axial alignment of the input adaptor relative to the output adaptor is varied according to the rotational orientation of the adjustment discs relative to each other.

6. The on-vehicle brake lathe system of claim 5 wherein:
   the adjustment mechanism comprises a first stop disc associated with the at least one adjustment disc and a second stop disc associated with the second adjustment disc; and
   each stop disc is operable in a first state to follow the rotation of the drive shaft and operable in a second state to rotate relative to the rotation of the drive shaft to change the rotational orientation of the associated adjustment disc.

7. An on-vehicle brake lathe system for resurfacing a brake disc of a vehicle brake assembly, the on-vehicle brake lathe system comprising a lathe body with a driving motor, a cutting head operably attached to the lathe body, and a drive shaft, the on-vehicle brake lathe system being further defined by an alignment system including:
   an electronic controller operable to produce a control signal;
   an input adaptor configured to rotate with the drive shaft;
   an output adaptor configured to rotate with the drive shaft;
   a first adjustment disc positioned between the input adaptor and the output adaptor;
   a second adjustment disc positioned between the input adaptor and the output adaptor, wherein the axial alignment of the input adaptor relative to the output adaptor is varied according to the rotational orientation, of the adjustment discs relative to each other; and
   an adjustment mechanism connected to receive the control signal from the electronic controller and configured to change the rotational orientation of the adjustment discs in response to the control signal from the electronic controller;
   wherein:
   the adjustment mechanism comprises a first stop disc associated with the first adjustment disc and a second stop disc associated with the second adjustment disc;
   each stop disc is operable in a first state to follow the rotation of the drive shaft and operable in a second state to rotate relative to the rotation of the drive shaft to change the rotational orientation of the associated adjustment disc; and
   the adjustment mechanism further comprises a stop mechanism associated with the stop discs.

8. The on-vehicle brake lathe system of claim 7 wherein:
   the first stop disc operates in the first state when the stop mechanism is in the first position, operates in the second state when the stop mechanism is in the second position at a first time, and operates in the first state when the stop mechanism is in the second position at a second time different from the first time, and
   the second stop disc operates in the first state when the stop mechanism is in the first position and when the stop mechanism is in the second position at the first time, and operates in the second state when the stop mechanism is in the second position at the second time.

9. The on-vehicle brake lathe system of claim 8 wherein:

the adjustment mechanism comprises a third stop disc associated with the first adjustment disc and a fourth stop disc associated with the second adjustment disc; and each stop disc is operable in a first state to follow the rotation of the drive shaft and operable in a second state to rotate relative to the rotation of the drive shaft to change the rotational orientation of the associated adjustment disc.

10. The on-vehicle brake lathe system of claim 9 wherein:

the third stop disc operates in the first state when the stop mechanism is in the first position and when the stop mechanism is in the second position at the first and second times, operates in the second state when the stop mechanism is in the second position at a third time different from the first and second times, and operates in the first state when the stop mechanism is in the second position at a fourth time different from the first, second, and third times, and the fourth stop disc operates in the first state when the stop mechanism is in the first position and when the stop mechanism is in the second position at the first, second and third times, and operates in the second state when the stop mechanism is in the second position at the fourth time.

11. The on-vehicle brake lathe system of claim 5 wherein:

the first and second adjustment discs comprise slant discs that each include a slanted surface, and the adjustment discs are arranged so that the slanted surfaces are opposed to each other in an abutting relationship.

12. The on-vehicle brake lathe system of claim 6 further comprising a first gear train operably associated with the first stop disc and a second gear train operably associated with the second stop disc, the gear trains being configured to follow the movement of the respective stop disc, the first gear train being operably associated with the first adjustment disc, and the second gear train being operably associated with the second adjustment disc.

13. The on-vehicle brake lathe system of claim 9 further comprising a first gear train operably associated with the first and third stop discs and a second gear train operably associated with the second and fourth stop discs, the gear trains being configured to follow the movement of the respective stop discs, the first gear train being operably associated with the first adjustment disc, and the second gear train being operably associated with the second adjustment disc.

14. The on-vehicle brake lathe system of claim 13 wherein each gear train is configured such that the associated adjustment disc is caused to rotate in a first rotational direction when one of the pair of stop discs associated with the gear train stops rotating, and the associated adjustment disc is caused to rotate in a rotational direction opposite to the first rotational direction when the other of the pair of stop discs associated with the gear train stops rotating.

15. The on-vehicle brake lathe system of claim 2 wherein the stop disc comprises a starwheel having protruding teeth.

16. The on-vehicle brake lathe system of claim 15 wherein the adjustment mechanism further comprises a stop mechanism associated with the stop disc and operable to move between a first position in which the stop disc operates in the first state and a second position in which the stop disc is caused to operate in the second state.

17. The on-vehicle brake lathe system of claim 16 wherein the stop mechanism includes an electromagnetic element and a toothed catch member operable to engage at least one tooth of the starwheel.

18. The on-vehicle brake lathe system of claim 17 wherein the controller is configured to time actuation of the electromagnetic element such that the toothed catch moves into its first stop position to contact a specified tooth of the starwheel.

19. The on-vehicle brake lathe system of claim 1 further comprising a draw bar extending through the body of the lathe and the alignment system and operable for connection to a hub adaptor of a vehicle brake assembly.

20. An on-vehicle brake lathe system for resurfacing a brake disc of a vehicle brake assembly, the on-vehicle brake lathe system comprising a lathe body with a driving motor, a cutting head operably attached to the lathe body, and a drive shaft, the on-vehicle brake lathe system being further defined by an alignment system including:

an electronic controller operable to produce a control signal;

an input adaptor configured to rotate with the drive shaft;

an output adaptor configured to rotate with the drive shaft;

at least one adjustment disc positioned between the input adaptor and the output adaptor, wherein an axial alignment of the input adaptor relative to the output adaptor is varied according to a rotational orientation of the adjustment disc;

an adjustment mechanism connected to receive the control signal from the electronic controller and configured to change the rotational orientation of the adjustment disc in response to the control signal from the electronic controller; and a component for measuring lateral runout of the brake disc of the vehicle brake assembly and providing the measurement to the electronic controller, wherein the electronic controller produces the control signal based on the measurement.

21. An automatic alignment assembly for use in an on-vehicle brake lathe system for resurfacing a brake disc of a vehicle brake assembly, the alignment system comprising:

a component operable to produce a signal indicative of movement of the lathe body;

an electronic controller connected to receive the signal from the component and operable to produce a control signal using the signal from the component;

an input adaptor configured to rotate with a drive shaft of a brake lathe system;

an output adaptor configured to rotate with the drive shaft;

at least one adjustment disc positioned between the input adaptor and the output adaptor, wherein an axial alignment of the input adaptor relative to the output adaptor is varied according to a rotational orientation of the adjustment disc; and an adjustment mechanism connected to receive the control signal from the electronic controller and configured to change the rotational orientation of the adjustment disc in response to the control signal from the electronic controller.

22. The automatic alignment assembly of claim 21 wherein the adjustment mechanism comprises a stop disc operable in a first state to follow the rotation of the drive shaft and operable in a second state to rotate relative to the rotation of the drive shaft to change the rotational orientation of the adjustment disc.

23. An automatic alignment assembly for use in an on-vehicle brake lathe system for resurfacing a brake disc of a vehicle brake assembly, the alignment system comprising:
   an electronic controller operable to produce a control signal;
   an input adaptor configured to rotate with a drive shaft of a brake lathe system;
   an output adaptor configured to rotate with the drive shaft;
   at least one adjustment disc positioned between the input adaptor and the output adaptor, wherein an axial alignment of the input adaptor relative to the output adaptor is varied according to a rotational orientation of the adjustment disc; and
   an adjustment mechanism connected to receive the control signal from the electronic controller and configured to change the rotational orientation of the adjustment disc in response to the control signal from the electronic controller;
   wherein:
      the adjustment mechanism comprises a stop disc operable in a first state to follow the rotation of the drive shaft and operable in a second state to rotate relative to the rotation of the drive shaft to change the rotational orientation of the adjustment disc; and
      the adjustment mechanism further comprises a stop mechanism associated with the stop disc and operable to move between a first position in which the stop disc operates in the first state and a second position in which the stop disc is caused to operate in the second state.

24. The automatic alignment assembly of claim 23 wherein:
   the at least one stop disc comprises a pair of stop discs,
   the first stop disc operates in the first state when the stop mechanism is in the first position, operates in the second state when the stop mechanism is in the second position at a first time, and operates in the first state when the stop mechanism is in the second position at a second time different from the first time, and
   the second stop disc operates in the first state when the stop mechanism is in the first position and when the stop mechanism is in the second position at the first time, and operates in the second state when the stop mechanism is in the second position at the second time.

25. The automatic alignment assembly of claim 21 further comprising a second adjustment disc positioned between the input adaptor and the output adaptor, wherein the axial alignment of the input adaptor relative to the output adaptor may be varied based on the rotational orientation of the adjustment discs relative to each other.

26. The automatic alignment assembly of claim 25 wherein:
   the adjustment mechanism comprises a first stop disc associated with the first adjustment disc and a second stop disc associated with the second adjustment disc; and
   each stop disc is operable in a first state to follow the rotation of the drive shaft and operable in a second state to rotate relative to the rotation of the drive shaft to change the rotational orientation of the associated adjustment disc.

27. The automatic alignment assembly of claim 26 wherein the adjustment mechanism further comprises a stop mechanism associated with the stop discs.

28. The automatic alignment assembly of claim 27 wherein:
   the first stop disc operates in the first state when the stop mechanism is in the first position, operates in the second state when the stop mechanism is in the second position at a first time, and operates in the first state when the stop mechanism is in the second position at a second time different from the first time, and
   the second stop disc operates in the first state when the stop mechanism is in the first position and when the stop mechanism is in the second position at the first time, and operates in the second state when the stop mechanism is in the second position at the second time.

29. The automatic alignment assembly of claim 28 wherein:
   the adjustment mechanism comprises a third stop disc associated with the first adjustment disc and a fourth stop disc associated with the second adjustment disc; and
   each stop disc is operable in a first state to follow the rotation of the drive shaft and operable in a second state to rotate relative to the rotation of the drive shaft to change the rotational orientation of the associated adjustment disc.

30. The automatic alignment assembly of claim 29 wherein:
   the third stop disc operates in the first state when the stop mechanism is in the first position and when the stop mechanism is in the second position at the first and second times, operates in the second state when the stop mechanism is in the second position at a third time different from the first and second times, and operates in the first state when the stop mechanism is in the second position at a fourth time different from the first, second, and third times, and
   the fourth stop disc operates in the first state when the stop mechanism is in the first position and when the stop mechanism is in the second position at the first, second and third times, and operates in the second state when the stop mechanism is in the second position at the fourth time.

31. The automatic alignment assembly of claim 27 wherein:
   the first and second adjustment discs comprise slant discs that each include a slanted surface, and
   the adjustment discs are arranged so that the slanted surfaces are opposed to each other in an abutting relationship.

32. The automatic alignment assembly of claim 26 further comprising a first gear train operably associated with the first stop disc and a second gear train operably associated with the second stop disc, the gear trains being configured to follow the movement of the respective stop disc, the first gear train being operably associated with the first adjustment disc, and the second gear train being operably associated with the second adjustment disc.

33. The automatic alignment assembly of claim 29 further comprising a first gear train operably associated with the first and third stop discs and a second gear train operably associated with the second and fourth stop discs, the gear trains being configured to follow the movement of the respective stop discs, the first gear train being operably associated with the first adjustment disc, and the second gear train being operably associated with the second adjustment disc.

34. The automatic alignment assembly of claim 33 wherein each gear train is configured such that the associated adjustment disc is caused to rotate in a first rotational direction when one of the pair of stop discs associated with the gear train stops rotating, and the associated adjustment discs is caused to rotate in a rotational direction opposite to the first rotational direction when the other of the pair of stop discs associated with the gear train stops rotating.

35. The automatic alignment assembly of claim 32 wherein the stop disc comprises a starwheel having protruding teeth.

36. The automatic alignment assembly of claim 35 wherein the adjustment mechanism further comprises a stop mechanism associated with the stop disc and operable to move between a first position in which the stop disc operates in the first state and a second position in which the stop disc is caused to operate in the second state.

37. The automatic alignment assembly of claim 36 wherein the stop mechanism includes an electromagnetic element and a toothed catch member operable to engage at least one tooth of the starwheel.

38. The automatic alignment assembly of claim 37 wherein the controller is configured to time actuation of the electromagnetic element such that the toothed catch moves into its first stop position to contact a specified tooth of the starwheel.

39. The automatic alignment assembly of claim 21 further comprising a draw bar extending through the body of the lathe and the alignment system and operable for connection to a hub adaptor of a vehicle brake assembly.

40. An automatic alignment assembly for use in an on-vehicle brake lathe system for resurfacing a brake disc of a vehicle brake assembly, the alignment system comprising:
   an electronic controller operable to produce a control signal;
   an input adaptor configured to rotate with a drive shaft of a brake lathe system;
   an output adaptor configured to rotate with the drive shaft;
   at least one adjustment disc positioned between the input adaptor and the output adaptor, wherein an axial alignment of the input adaptor relative to the output adaptor is varied according to a rotational orientation of the adjustment disc;
   an adjustment mechanism connected to receive the control signal from the electronic controller and configured to change the rotational orientation of the adjustment disc in response to the control signal from the electronic controller; and
   a component for measuring lateral runout of the brake disc of the vehicle brake assembly and providing the measurement to the electronic controller, wherein the electronic controller produces the control signal based on the measurement.

41. An apparatus for aligning the axes of two rotating shafts comprising:
   an electronic controller operable to produce a control signal;
   a first input adaptor configured to rotate with a first shaft;
   second output adaptor configured to rotate with the second shaft;
   at least one adjustment disc positioned between the input adaptor and the output adaptor, wherein an axial alignment of the input adaptor relative to the output adaptor is varied according to a rotational orientation of the adjustment disc;
   an adjustment mechanism connected to receive the control signal from the electronic controller and configured to change the rotational orientation of the adjustment disc in response to the commands from the electronic controller; and
   a component operable to produce a signal indicative of movement of an element coupled to the input adaptor;
   wherein the electronic controller is connected to receive the signal from the component and operable to use the signal from the component in producing the control signal.

42. An on-vehicle brake lathe system for resurfacing a brake disc of a vehicle brake assembly, the on-vehicle brake lathe system including a lathe body with a driving motor, a cutting head operably attached to the body, and a drive shaft, the on-vehicle brake lathe system being further defined by an alignment system comprising:
   an input adaptor configured to rotate with the drive shaft;
   an output adaptor configured to rotate with the drive shaft;
   a stop disc system including one or more stop discs;
   one or more adjustment discs operable to rotate in response to the relative rotation of at least one stop disc, the one or more adjustment discs being operable to adjust the axial alignment of the drive shaft with respect to an axis of rotation of the brake disc; and
   a stop mechanism associated with the stop disc system wherein the stop mechanism is operable to cause at least one of the stop discs to rotate.

43. The on-vehicle brake lathe system of claim 42 wherein:
   the one or more stop discs comprise two pairs of stop discs, and
   the stop mechanism is operable to cause any of the stop discs to rotate.

44. The on-vehicle brake lathe system of claim 42 wherein the stop discs are rotatably secured to the input adaptor such that the stop discs rotate with the input adaptor and such that the stop mechanism is operable to cause any of the stop discs to rotate relative to the input adaptor.

45. The on-vehicle brake lathe system of claim 44 wherein the stop discs comprise starwheels having a plurality of protruding teeth.

46. The on-vehicle brake lathe system of claim 45 wherein the stop mechanism comprises an electromagnetic element and a toothed catch member operable to engage at least one of the plurality of teeth of the starwheels.

47. The on-vehicle brake lathe system of claim 46 further comprising means for timing the actuation of the stop mechanism such that the toothed catch member contacts a specified stop disc upon receipt of a control signal.

48. An on-vehicle brake lathe system for resurfacing a brake disc of a vehicle brake assembly, the on-vehicle brake lathe system comprising a lathe body with a driving motor, a cutting head operably attached to the body, and a drive shaft, the on-car brake lathe system further defined by an alignment system comprising:
   an input adaptor configured to rotate with the drive shaft;
   an output adaptor configured to rotate with the drive shaft;
   a stop disc system comprising two pairs of stop discs and a stop mechanism operable to cause any of the stop discs to rotate; and
   one or more adjustment discs operable to rotate in response to the relative rotation of at least one stop disc, the adjustment discs configured to be capable of adjusting the axial alignment of the drive shaft with respect to all axis of rotation of the brake disc.

49. An on-vehicle brake lathe system for resurfacing a brake disc of a vehicle brake assembly, the on-vehicle brake lathe system comprising a lathe body with a driving motor, a cutting head operably attached to the lathe body, and a drive shaft, the on-vehicle brake lathe system being further defined by an alignment system including:

a component operable to produce a signal indicative of movement of the lathe body, an electronic controller operable to receive the signal from the component and to produce a control signal using the signal from the component;

an input adaptor configured to rotate with the drive shaft;

an output adaptor configured to rotate with the drive shaft;

an adjustment element extending from one of the input adaptor and the output adaptor, wherein an axial alignment of the input adaptor relative to the output adaptor is varied according to an amount by which the adjustment element extends from the one of the input adaptor and the output adaptor; and an adjustment mechanism connected to receive the control signal from the electronic controller and configured to change the amount by which the adjustment element extends in response to the control signal from the electronic controller.

50. The on-vehicle brake lathe system of claim 49 wherein the adjustment element comprises a servo-controlled extender.

51. The on-vehicle brake lathe system of claim 50 wherein the alignment system further comprises a plurality of servo-controlled extenders, each servo-controlled extender extending from one of the input adaptor and the output adaptor.

52. The on-vehicle brake lathe system of claim 49 wherein the alignment system further comprises a plurality of adjustment elements, each adjustment element extending from one of the input adaptor and the output adaptor.

53. The on-vehicle brake lathe system of claim 52 further comprising a joint that allows spherical motion, wherein the joint is positioned between the input adaptor and the output adaptor, and the adjustment elements comprise adjustable-length arms extending between the input adaptor and the output adaptor such that an orientation of the input adaptor relative to the output adaptor is varied by varying lengths of the arms.

54. An automatic alignment assembly for use in an on-vehicle brake lathe system for resurfacing a brake disc of a vehicle brake assembly, the alignment system comprising:

a component operable to produce a signal indicative of movement of the lathe body;

an electronic controller connected to receive the signal from the component and operable to produce a control signal using the signal from the component;

an input adaptor configured to rotate with a drive shaft of a brake lathe system;

an output adaptor configured to rotate with the drive shaft;

an adjustment element extending from one of the input adaptor and the output adaptor, wherein an axial alignment of the input adaptor relative to the output adaptor is varied according to an amount by which the adjustment element extends from the one of the input adaptor and the output adaptor; and an adjustment mechanism connected to receive the control signal from the electronic controller and configured to change the amount by which the adjustment element extends in response to the control signal from the electronic controller.

55. The automatic alignment assembly of claim 54 wherein the adjustment element comprises a servo-controlled extender.

56. The automatic alignment assembly of claim 55 further comprising a plurality of servo-controlled extenders, each servo-controlled extender extending from one of the input adaptor and the output adaptor.

57. The automatic alignment assembly of claim 54 further comprising a plurality of adjustment elements, each adjustment element extending from one of the input adaptor and the output adaptor.

58. The automatic alignment assembly of claim 57 further comprising a joint permitting spherical motion, wherein the joint is positioned between the input adaptor and the output adaptor, and the adjustment elements comprise adjustable-length arms extending between the input adaptor and the output adaptor such that an orientation of the input adaptor relative to the output adaptor is varied by varying lengths of the arms.

\* \* \* \* \*